(12) United States Patent
Asadi et al.

(10) Patent No.: US 10,984,039 B2
(45) Date of Patent: Apr. 20, 2021

(54) HIERARCHICAL MAP VISUALIZATIONS OF GEO-ENRICHED DATA

(71) Applicant: SAP SE, Walldorf (DE)

(72) Inventors: Mohsen Asadi, Vancouver (CA); Wan Gong, Coquitlam (CA); Christopher Tam, Vancouver (CA); Sae-Won Om, Vancouver (CA)

(73) Assignee: SAP SE, Walldorf (DE)

( * ) Notice: Subject to any disclaimer, the term of this patent is extended or adjusted under 35 U.S.C. 154(b) by 529 days.

(21) Appl. No.: 15/342,085

(22) Filed: Nov. 2, 2016

(65) Prior Publication Data

US 2018/0121442 A1   May 3, 2018

(51) Int. Cl.
*G06F 16/44* (2019.01)
*G06F 16/29* (2019.01)
*G06F 16/9537* (2019.01)

(52) U.S. Cl.
CPC ............ *G06F 16/444* (2019.01); *G06F 16/29* (2019.01); *G06F 16/9537* (2019.01)

(58) Field of Classification Search
CPC ......... G06F 17/30241; G06F 17/30554; G06F 17/30864
See application file for complete search history.

(56) References Cited

U.S. PATENT DOCUMENTS

| | | | | |
|---|---|---|---|---|
| 6,976,027 B2* | 12/2005 | Cutlip | ................... | H04L 67/16 711/216 |
| 8,756,222 B1* | 6/2014 | Vyas | ................... | G06F 16/9537 707/722 |
| 9,886,785 B2* | 2/2018 | Agrawal | ............. | G06F 17/3033 |
| 2002/0049742 A1* | 4/2002 | Chan | ................... | G06F 16/9537 |
| 2009/0005968 A1* | 1/2009 | Vengroff | ............. | G06F 16/9537 701/425 |
| 2010/0162091 A1* | 6/2010 | Yepez | ................ | G06F 16/9537 715/201 |
| 2012/0294434 A1* | 11/2012 | Fan | ........................ | H04L 67/18 379/142.1 |
| 2016/0033295 A1* | 2/2016 | Li | ........................ | G01C 21/367 345/660 |

* cited by examiner

*Primary Examiner* — Mahesh H Dwivedi
*Assistant Examiner* — Ken Hoang
(74) *Attorney, Agent, or Firm* — Fountainhead Law Group P.C.

(57) ABSTRACT

Some embodiments provide a non-transitory machine-readable medium that stores a program. The program receives a request for a map visualization that includes a plurality of geo-enriched data and geographical elements associated with a level of a plurality of levels in a hierarchy of geographical elements. The program further identifies a set of geographical elements associated with the level based on the hierarchy of geographical elements. The program also generates the map visualization to include the plurality of geo-enriched data and the set of geographical elements.

20 Claims, 16 Drawing Sheets

HIERARCHICAL MAP VISUALIZATIONS OF GEO-ENRICHED DATA

BACKGROUND

Maps and mapping technology are used in many current computing and mobile applications and services. For example, some applications or services utilize mapping technology to provide navigation functions, location functions, traffic congestion functions, etc. Other applications or services may employ mapping technology to provide location-based search functions, social-networking functions, ride-sharing services, etc.

SUMMARY

In some embodiments, a non-transitory machine-readable medium stores a program. The program receives a request for a map visualization that includes a plurality of geo-enriched data and geographical elements associated with a level of a plurality of levels in a hierarchy of geographical elements. The program further identifies a set of geographical elements associated with the level based on the hierarchy of geographical elements. The program also generates the map visualization to include the plurality of geo-enriched data and the set of geographical elements.

In some embodiments, the program further provides the map visualizations to a client device for the client device to display on a display of the client device. The request may be a first request. The program may further receive a second request to focus on a geographical element in the set of geographical elements. The program may also perform a set of spatial operations based on the plurality of geo-enriched data and the geographical element to identify a subset of the plurality of geo-enriched data associated with the geographical element. The program may further generate the map visualization to include the subset of geo-enriched data and the geographical element.

In some embodiments, the program further determines a set of ancestor geographical elements of the geographical element based on the hierarchy of geographical elements. In some embodiments, the set of spatial operations is a first set of spatial operations and the subset of the plurality of geo-enriched data is a first subset of the plurality of geo-enriched data. The program may further receive a third request to focus on an ancestor geographical element in the set of ancestor geographical elements. The program may also perform a second set of spatial operations based on the plurality of geo-enriched data and the ancestor geographical element to identify a second subset of the plurality of geo-enriched data associated with the ancestor geographical element. The program may further generate the map visualization to include the second subset of geo-enriched data and the ancestor geographical element.

In some embodiments, the set of spatial operations is a first set of spatial operations and the subset of the plurality of geo-enriched data is a first subset of the plurality of geo-enriched data. The program may further receive a third request to focus on a descendant geographical element of the geographical element in the hierarchy of geographical elements. The program may also perform a second set of spatial operations based on the plurality of geo-enriched data and the descendant geographical element to identify a second subset of the plurality of geo-enriched data associated with the descendant geographical element. The program may further generate the map visualization to include the second subset of geo-enriched data and the descendant geographical element.

In some embodiments, the request is a first request, the level of the plurality of levels is a first level, and the set of geographical elements is a first set of geographical elements. The program may further receive a second request for the map visualization that includes the plurality of geo-enriched data and geographical elements associated with a second level of the plurality of levels in the hierarchy of geographical elements. The program may also identify a set of geographical elements associated with the second level based on the hierarchy of geographical elements. The program may further generate the map visualization to include the plurality of geo-enriched data and the set of geographical elements.

In some embodiments, a method receives a request for a map visualization that includes a plurality of geo-enriched data and geographical elements associated with a level of a plurality of levels in a hierarchy of geographical elements. The method further identifies a set of geographical elements associated with the level based on the hierarchy of geographical elements. The method also generates the map visualization to include the plurality of geo-enriched data and the set of geographical elements.

In some embodiments, the method further provides the map visualizations to a client device for the client device to display on a display of the client device. The request may be a first request. The method may further receive a second request to focus on a geographical element in the set of geographical elements. The method may also perform a set of spatial operations based on the plurality of geo-enriched data and the geographical element to identify a subset of the plurality of geo-enriched data associated with the geographical element. The method may further generate the map visualization to include the subset of geo-enriched data and the geographical element.

In some embodiments, the method further determines a set of ancestor geographical elements of the geographical element based on the hierarchy of geographical elements. In some embodiments, the set of spatial operations is a first set of spatial operations and the subset of the plurality of geo-enriched data is a first subset of the plurality of geo-enriched data. The method may further receive a third request to focus on an ancestor geographical element in the set of ancestor geographical elements. The method may also perform a second set of spatial operations based on the plurality of geo-enriched data and the ancestor geographical element to identify a second subset of the plurality of geo-enriched data associated with the ancestor geographical element. The method may further generate the map visualization to include the second subset of geo-enriched data and the ancestor geographical element.

In some embodiments, the set of spatial operations is a first set of spatial operations and the subset of the plurality of geo-enriched data is a first subset of the plurality of geo-enriched data. The method may further receive a third request to focus on a descendant geographical element of the geographical element in the hierarchy of geographical elements. The method may also perform a second set of spatial operations based on the plurality of geo-enriched data and the descendant geographical element to identify a second subset of the plurality of geo-enriched data associated with the descendant geographical element. The method may further generate the map visualization to include the second subset of geo-enriched data and the descendant geographical element.

In some embodiments, the request is a first request, the level of the plurality of levels is a first level, and the set of geographical elements is a first set of geographical elements. The method may further receive a second request for the map visualization that includes the plurality of geo-enriched data and geographical elements associated with a second level of the plurality of levels in the hierarchy of geographical elements. The method may also identify a set of geographical elements associated with the second level based on the hierarchy of geographical elements. The method may further generate the map visualization to include the plurality of geo-enriched data and the set of geographical elements.

In some embodiments, a system includes a set of processing units and a non-transitory computer-readable medium storing instructions. The instructions cause at least one processing unit to receive a request for a map visualization that includes a plurality of geo-enriched data and geographical elements associated with a level of a plurality of levels in a hierarchy of geographical elements. The instructions further cause the at least one processing unit to identify a set of geographical elements associated with the level based on the hierarchy of geographical elements. The instructions also cause the at least one processing unit to generate the map visualization to include the plurality of geo-enriched data and the set of geographical elements.

In some embodiments, the instructions further cause the at least one processing unit to provide the map visualizations to a client device for the client device to display on a display of the client device. The request may be a first request. The instructions may further cause the at least one processing unit to receive a second request to focus on a geographical element in the set of geographical elements. The instructions may also cause the at least one processing unit to perform a set of spatial operations based on the plurality of geo-enriched data and the geographical element to identify a subset of the plurality of geo-enriched data associated with the geographical element. The instructions may further cause the at least one processing unit to generate the map visualization to include the subset of geo-enriched data and the geographical element.

In some embodiments, the set of spatial operations is a first set of spatial operations and the subset of the plurality of geo-enriched data is a first subset of the plurality of geo-enriched data. The instructions may further cause the at least one processing unit to determine a set of ancestor geographical elements of the geographical element based on the hierarchy of geographical elements. The instructions may also cause the at least one processing unit to receive a third request to focus on an ancestor geographical element in the set of ancestor geographical elements. The instructions may further cause the at least one processing unit to perform a second set of spatial operations based on the plurality of geo-enriched data and the ancestor geographical element to identify a second subset of the plurality of geo-enriched data associated with the ancestor geographical element. The instructions may also cause the at least one processing unit to generate the map visualization to include the second subset of geo-enriched data and the ancestor geographical element.

In some embodiments, the set of spatial operations is a first set of spatial operations and the subset of the plurality of geo-enriched data is a first subset of the plurality of geo-enriched data. The instructions may further cause the at least one processing unit to receive a third request to focus on a descendant geographical element of the geographical element in the hierarchy of geographical elements. The instructions may also cause the at least one processing unit to perform a second set of spatial operations based on the plurality of geo-enriched data and the descendant geographical element to identify a second subset of the plurality of geo-enriched data associated with the descendant geographical element. The instructions may further cause the at least one processing unit to generate the map visualization to include the second subset of geo-enriched data and the descendant geographical element.

In some embodiments, wherein request is a first request, the level of the plurality of levels is a first level, and the set of geographical elements is a first set of geographical elements. The instructions may further cause the at least one processing unit to receive from the client device a second request for the map visualization comprising the plurality of geo-enriched data and geographical elements associated with a second level of the plurality of levels in the hierarchy of geographical elements. The instructions may also cause the at least one processing unit to identify a set of geographical elements associated with the second level based on the hierarchy of geographical elements. The instructions may further cause the at least one processing unit to generate the map visualization to include the plurality of geo-enriched data and the set of geographical elements.

The following detailed description and accompanying drawings provide a better understanding of the nature and advantages of the present invention.

DETAILED DESCRIPTION

Figure 1:
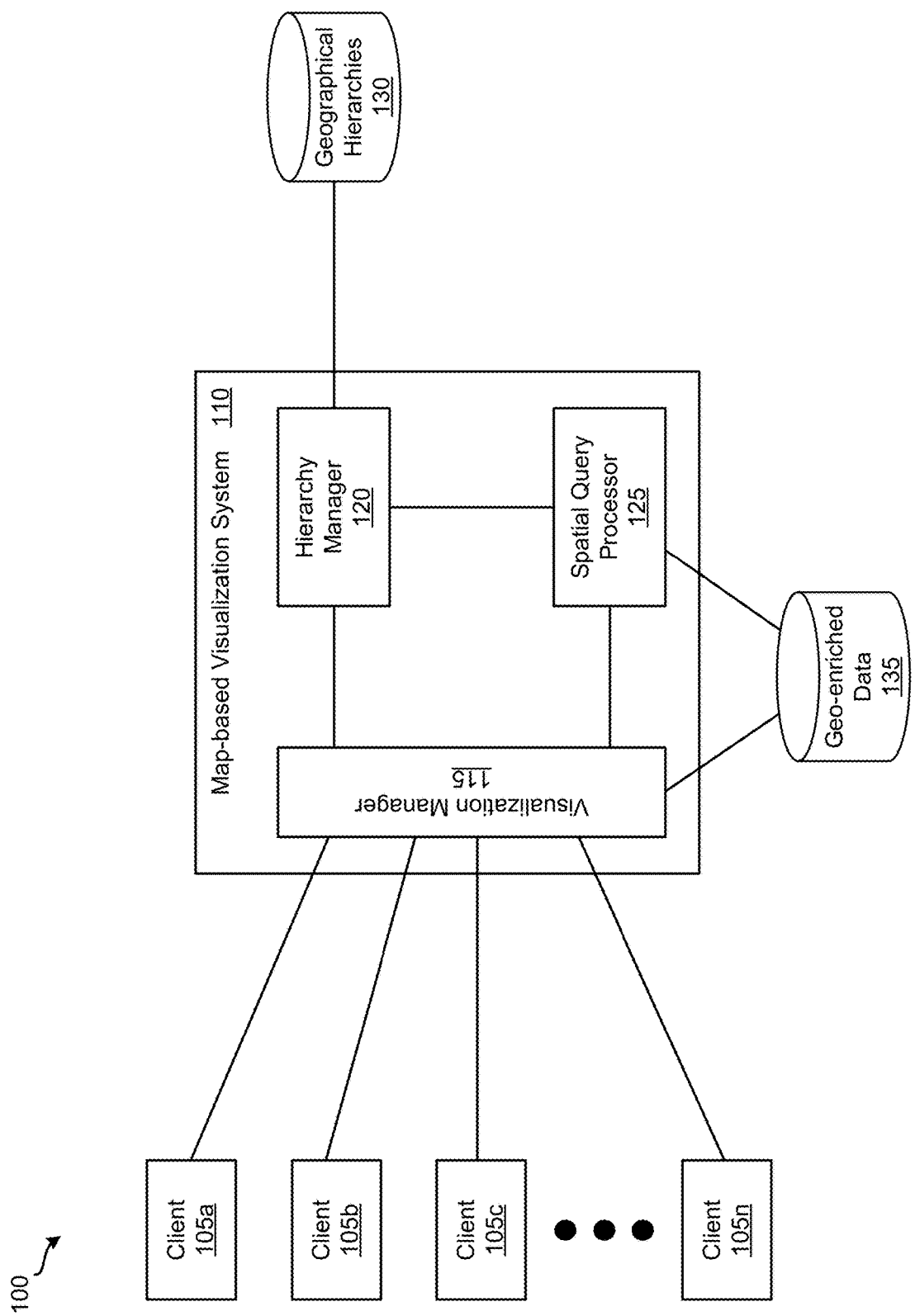
FIG. 1 illustrates a system 100 that includes a map-based visualization system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a map-based visualization system configured to provide map visualizations of geo-enriched data. In some embodiments, the map-based visualization system provides map visualizations of geographical elements (e.g., locations, areas, regions, etc.) based on a defined hierarchy of the geographical elements. The map-based visualization system may provide a map visualization of geo-enriched data at different levels (e.g., a country level, a state level, a city level, etc.) of the defined hierarchy of the geographical elements.

The map-based visualization system may include an option for focusing on geo-enriched data associated with a particular geographical element in a map visualization. When the option is selected, the map-based visualization system may provide a map visualization that shows only the geo-enriched data included the geographical element. The option may also allow the focus to be changed from the particular geographical element to an ancestor geographical element or a descendent geographical element.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data. In some embodiments, location data is data that describes a location, area, region, or combination thereof (e.g., a location, area, region, or combination thereof on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

FIG. 1 illustrates a system 100 that includes a map-based visualization system according to some embodiments. As shown, system 100 includes client devices 105a-n, map-based visualization system 110, geographical hierarchies storage 130, and geocoding data storage 135. Client devices 105a-n are configured to access and communicate with map-based visualization system 110 (e.g., via a network). For instance, a user may use a client device 105 to send map-based visualization system 110 requests for map visualizations of geo-enriched data at different levels, requests to focus on geo-enriched data associated with a geographical element, requests to focus on geo-enriched data associated with ancestors or descendants of a geographical element, etc.

Geographical hierarchies storage 130 is configured to store defined hierarchies of geographical elements. Geocoding data storage 135 is configured to store geo-enriched data. Storages 130 and 135 may be relational databases managed by a database management system (DBMS) application (not shown) that operates on map-based visualization system 110. In some embodiments, storages 130 and 135 are implemented in a single physical storage while, in other embodiments, storages 130 and 135 may be implemented across several physical storages. While FIG. 1 shows storages 130 and 135 as external to map-based visualization system 110, one of ordinary skill in the art will appreciated that storages 130 and 135 may be included in map-based visualization system 110 in some embodiments.

As shown in FIG. 1, map-based visualization system 110 includes visualization manager 115, hierarchy manager 120, and spatial query processor 125. Visualization manager 115 is configured to provide an interface through which client devices 105a-n may communicate with map-based visualization system 110. Through such an interface, visualization manager 115 may receive requests from client devices 105a-n for map visualizations of geo-enriched data. In response to such a request, visualization manager 115 interacts with hierarchy manager 120 and/or spatial query processor 125 to generate the requested map visualization. Visual manager 115 then provides the generated map visualization to the requesting client device 105 for the client device 105 to display on a display of the client device 105.

Figure 2:
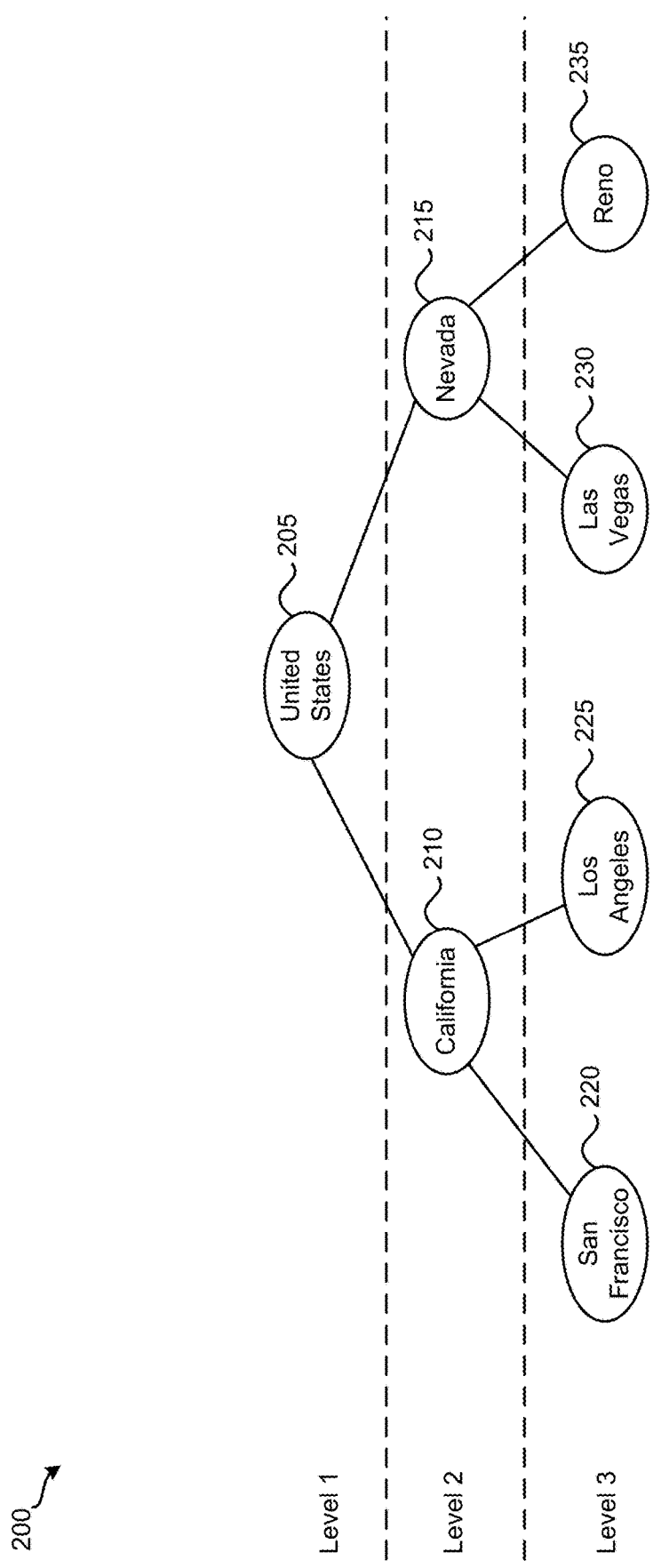
FIG. 2 illustrates an example hierarchy of geographical elements according to some embodiments.

In some embodiments, visualization manager 115 receives from a client device 105 a request for a map visualization of geo-enriched data that specifies a level in a defined hierarchy of geographical elements. A geographical element may be, in some embodiments, a geographical location, area, region, or combination thereof in a defined space (e.g., the surface of the Earth). FIG. 2 illustrates an example hierarchy 200 of geographical elements according to some embodiments. As illustrated, hierarchy 200 includes nodes 205-235. Specifically, node 205 represents a United States geographical element at level one of hierarchy 200. Node 205 has two child nodes 210 and 215, which represent a California geographical element and a Nevada geographical element, respectively, at level two of hierarchy 200. Node 210 has two child nodes 220 and 225, which represent a San Francisco geographical element and a Los Angeles geographical element, respectively, at level three of hierarchy 200. Lastly, node 215 has two child nodes 230 and 235, which represent a Las Vegas geographical element and a Reno geographical element, respectively, at level three of hierarchy 200.

Figure 3:
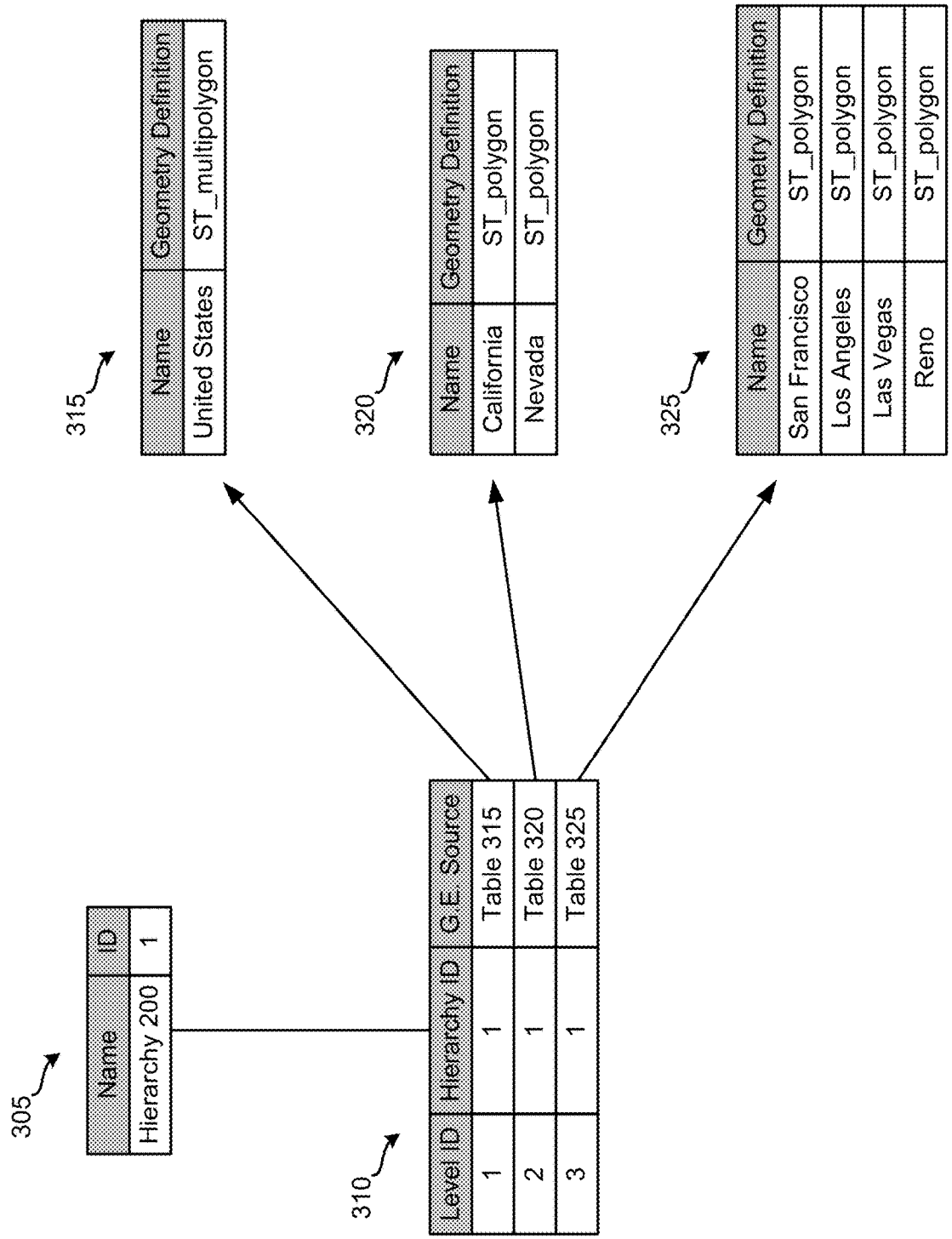
FIG. 3 illustrates an example set of tables for storing the hierarchy of geographical elements illustrated in FIG. 2 according to some embodiments.

Hierarchy may be implemented in any number of different ways. FIG. 3 illustrates an example set of tables for storing the hierarchy of geographical elements illustrated in FIG. 2 according to some embodiments. In particular, FIG. 3 illustrates five tables 305-325. Table 305. Table 305 (referred to as a hierarchy table) includes a Name column for storing a name of a hierarchy and an ID column for storing a unique identifier associated with the hierarchy. In this example, table 305 includes a row of data for defining hierarchy 200, which has a name of "Hierarchy 200" and an ID of 1.

Table 310 (referred to as a hierarchy level table) includes a level ID column for storing an identifier associated with a level in a hierarchy, a hierarchy ID column for storing an identifier associated with a hierarchy in table 305, and a geographical element (G.E.) source for storing a reference to a source of geographical element definitions associated with level in the hierarchy. For this example, table 310 includes three rows of data. The first row of data defines geographical elements associated with level one of hierarchy 200, which has a level ID of 1, a hierarchy ID of 1, and a reference to table 315 as the source of geographical elements associated with level one of hierarchy 200. The second row of data defines geographical elements associated with level two of hierarchy 200, which has a level ID of 2, a hierarchy ID of 1, and a reference to table 320 as the source of geographical elements associated with level two of hierarchy 200. The third row of data defines geographical elements associated with level three of hierarchy 200, which has a level ID of 3, a hierarchy ID of 1, and a reference to table 325 as the source of geographical elements associated with level three of hierarchy 200.

Tables 315-325 include a Name column for storing a name of a geographical element and a geometry definition column for storing a definition of a geometry that represents the geographical element. In some embodiments, spatial data is used to define of a geometry. As mentioned above, a spatial data may be represented using a particular spatial data type (e.g., an ST_point, an ST_curve, an ST_polygon, etc.). In this example, table 315 includes a row of data for defining the United States geographical element (i.e., node 205) in hierarchy 200, which has a name of "United States" and a geometry defined by a ST_multipolygon. In addition, table 320 includes two row of data for defining the California geographical element (i.e., node 210) in hierarchy 200, which has a name of "California" and a geometry defined by a ST_polygon and the Nevada geographical element (i.e., node 215) in hierarchy 200, which has a name of "Nevada" and a geometry defined by a ST_polygon. Table 325 includes four rows or data for defining the San Francisco geographical element (i.e., node 220) in hierarchy 200, which has a name of "San Francisco" and a geometry defined by a ST_polygon, the Los Angeles geographical element (i.e., node 225) in hierarchy 200, which has a name of "Los Angeles" and a geometry defined by a ST_polygon, the Las Vegas geographical element (i.e., node 230) in hierarchy 200, which has a name of "Las Vegas" and a geometry defined by a ST_polygon, and the Reno geographical element (i.e., node 235) in hierarchy 200, which has a name of "Reno" and a geometry defined by a ST_polygon.

Referring back to FIG. 1, in response to a request for a map visualization of geo-enriched data that specifies a level in a defined hierarchy of geographical elements, visualization manager 115 sends hierarchy manager 120 a request for geographical elements associated with the requested level in the hierarchy of geographical elements. When visualization manager 115 receives the geographical elements (e.g., the geometry definition of the geographical elements) from hierarchy manager 120, visualization manager 115 generates a map visualization that includes the geo-enriched data and the geographical elements. In some embodiments, visualization manager 115 receives the geo-enriched data from the client device 105 requesting the map visualization. In other embodiments, the geo-enriched data is stored in geo-enriched data storage 135. In such embodiments, visualization manager 115 accesses geo-enriched data storage 135 and retrieves the geo-enriched data.

Figure 4A:
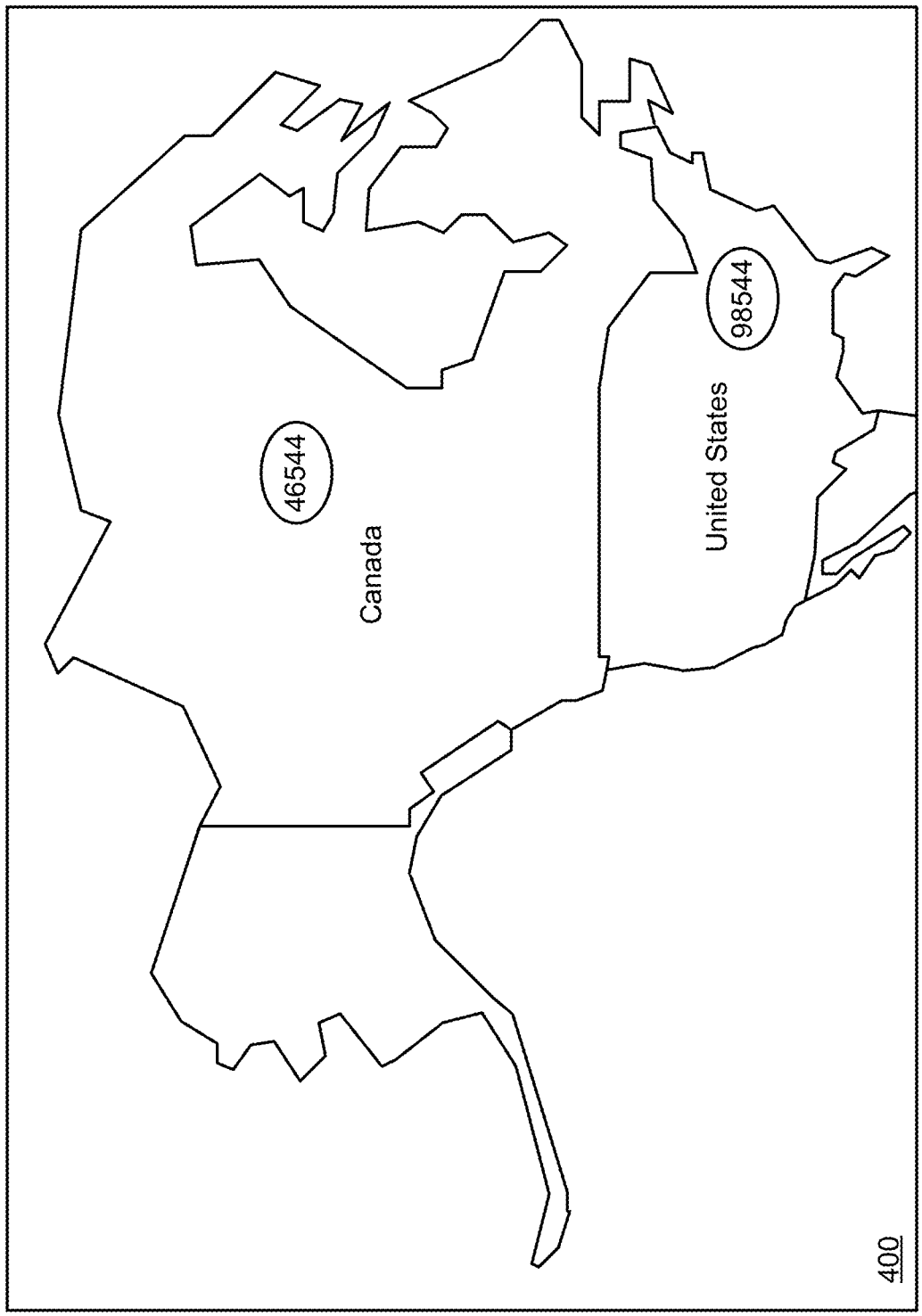
FIGS. 4A and 4B illustrate an example map visualization with geographical elements associated with different levels in a hierarchy of geographical elements according to some embodiments.
Figure 4B:
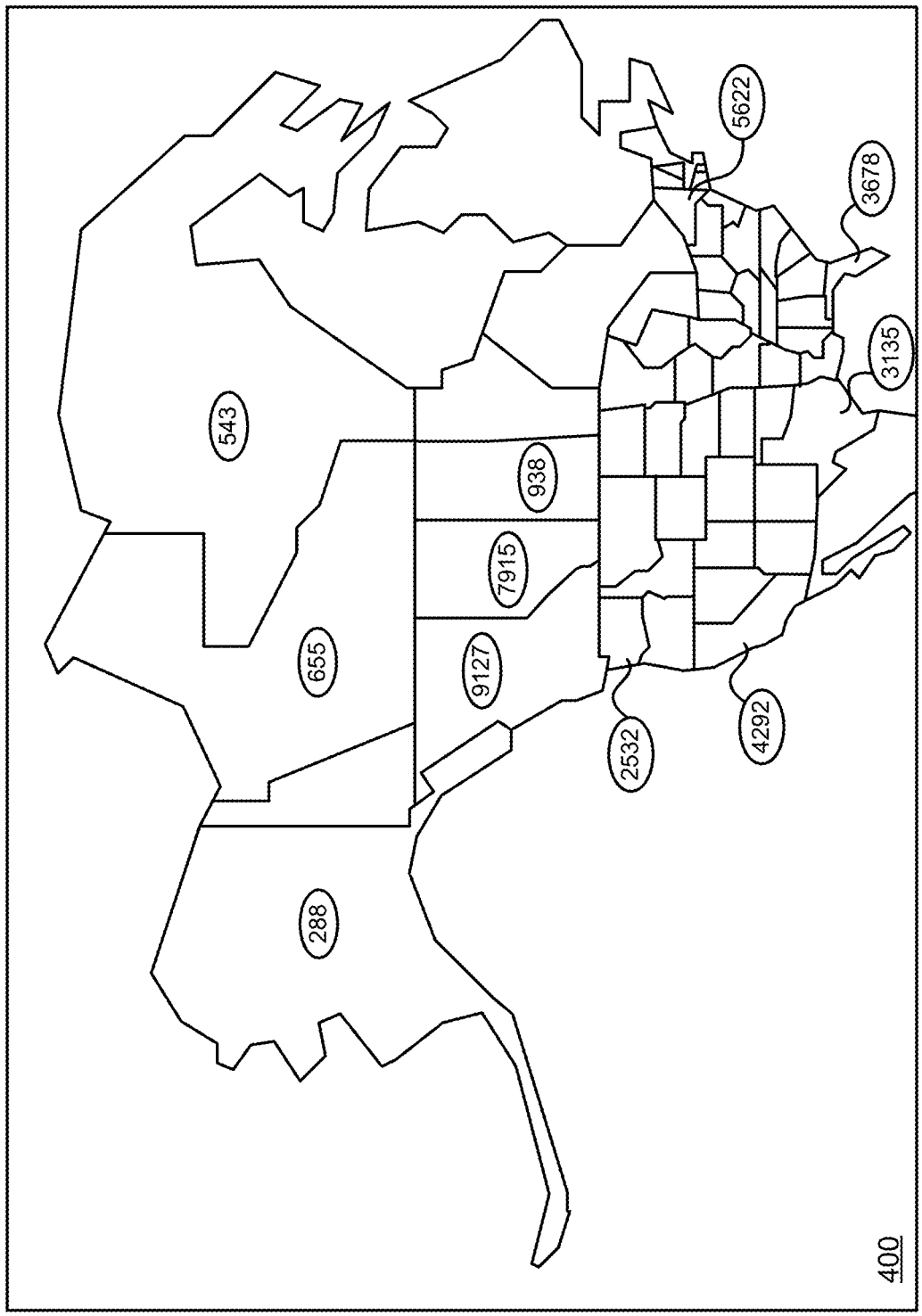

FIGS. 4A and 4B illustrate an example map visualization 400 with geographical elements associated with different levels in a hierarchy of geographical elements according to some embodiments. For this example, the hierarchy of geographical elements specifies the world at level 1, countries at level 2, and states/provinces at level 3. In addition, the geo-enriched data shown in FIGS. 4A and 4B represents store sales. FIG. 4A illustrates geographical elements associated with level 2 of the hierarchy, the country level, as well as the total store sales for each country. As shown, map visualization 400 shows the geographical elements that represent the countries of Canada and the United States and the corresponding store sales in the countries. FIG. 4B illustrates geographical elements associated with level 3 of the hierarchy, the state/province level as well as the total store sales for each state/province (not all provinces/states are shown for purpose of simplicity). As illustrated, map visualization 400 shows the geographical elements that represent the provinces of Canada and the states of the United States and the corresponding store sales for some of the provinces/states.

In some embodiments, visualization manager 115 receives from a client device 105 a request to focus on geo-enriched data associated with a particular geographical element in a map visualization. In response to such a request, visualization manager 115 sends hierarchy manager 120 a request for the particular geographical element. Once visualization manager 115 receives the particular geographical element (e.g., the geometry definition of the particular geographical element) from hierarchy manager 120, visualization manager 115 sends spatial query processor 125 the particular geographical elements along with the geo-enriched data or a reference to the geo-enriched data. Visualization manager 115 also sends spatial query processor 125 a request for a subset of the geo-enriched data associated with the particular geographical element. When visualization manager 115 receives the subset of the geo-enriched data from spatial query processor 125, visualization manager 115 generates a map visualization that includes the subset of the geo-enriched data and the particular geographical element.

Figure 5:
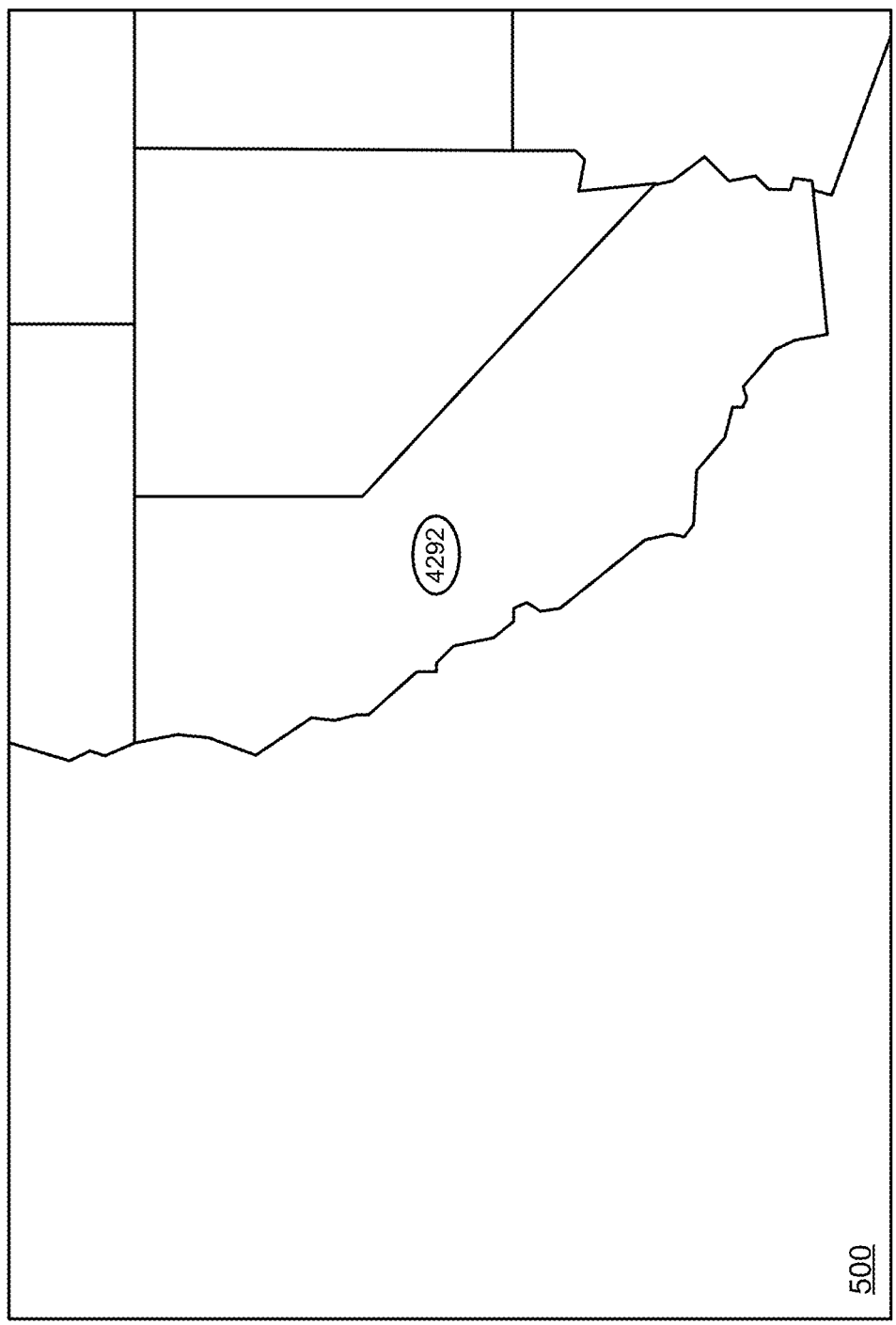
FIG. 5 illustrates an example focus operation on geo-enriched data associated with a geographical element illustrated in FIG. 4B according to some embodiments.

FIG. 5 illustrates an example focus operation on geo-enriched data associated with a geographical element illustrated in FIG. 4B according to some embodiments. In particular, FIG. 5 shows a map visualization 500 that focuses on the geo-enriched data associated with the state of California. As shown, map visualization 500 includes the store sales for the selected state of California. Store sales data associated with the other states are not included in map visualization 500.

Instead of providing a map visualization that includes the subset of the geo-enriched data and the particular geographical element, visualization manager 115 may generate a map visualization that includes the subset of the geo-enriched data and the children geographical elements of the particular geographical element. In some such embodiments, visualization manager 115 sends hierarchy manager 120 a request for the children geographical elements of the particular geographical element along with the request for the particular geographical element. This way, visualization manager 115 may generate a map visualization that includes the subset of the geo-enriched data and the children geographical elements of the particular geographical element.

Figure 6:
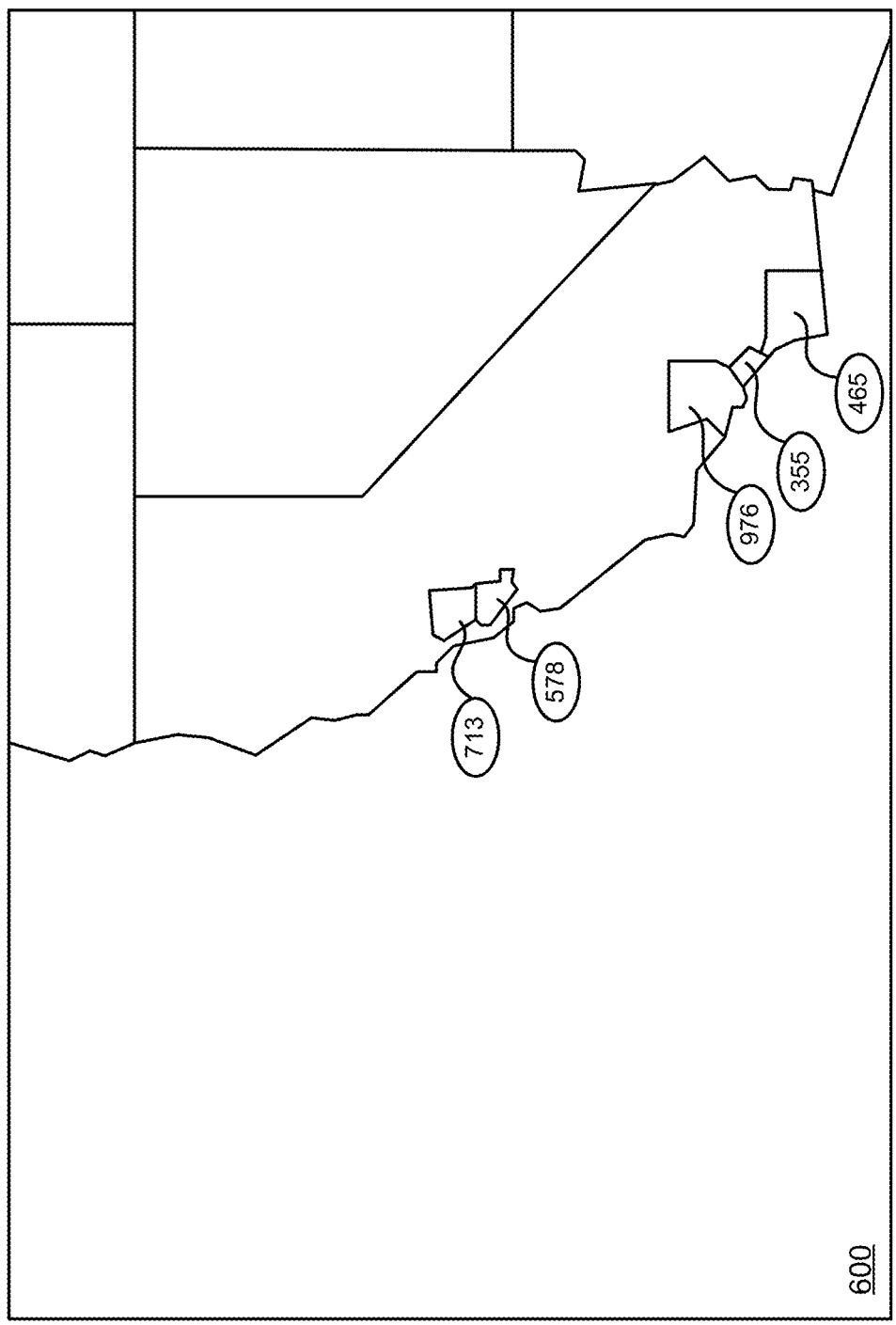
FIG. 6 illustrates an example map visualization that includes children geographical elements of a geographical element illustrated in FIG. 5 according some embodiments.

FIG. 6 illustrates an example map visualization 600 that includes children geographical elements of a geographical element illustrated in FIG. 5 according some embodiments. Specifically, FIG. 6 illustrates counties (not all counties are shown for the purpose of simplicity) of the geographical elements of the state of California illustrated in FIG. 5. FIG. 6 also shows the store sales for the counties in the state of California. Again, for the purpose of simplicity, store sales are not shown for counties that are not are shown.

As explained above, visualization manager 115 may receive from a client device 105 a request to focus on geo-enriched data associated with a particular geographical element in a map visualization. In some embodiments, visualization manager 115 may receive from the client device 105 a request to focus on geo-enriched data associated with an ancestor of a particular geographical element in a map visualization. In response to such a request, visualization manager 115 may send hierarchy manager 120 a request for ancestor geographical elements of the particular geographical element (also referred to as an ancestor path). Upon receiving the ancestor geographical elements of the particular geographical element, visualization manager 115 stores the ancestor path for later use. By storing the ancestor path of the particular geographical element for later use, visualization manager 115 may quickly generate a map visualization of geo-enriched data associated with an ancestor geographical element of the particular geographical element when a client device 105 requests to focus from the particular geographical element to the ancestor geographical element. In some embodiments, upon receiving the request from the client device 105, visualization manager 115 identifies the requested ancestor geographical element in the ancestor path of the particular geographical element. Visualization manager 115 sends spatial query processor 125 the ancestor geographical element, the geo-enriched data or a reference to the geo-enriched data, and a request for a subset of the geo-enriched data associated with the ancestor geographical element. When visualization manager 115 receives the subset of the geo-enriched data from spatial query processor 125, visualization manager 115 generates a map visualization that includes the subset of the geo-enriched data and the particular geographical element. As an example, a request to focus on an ancestor of the geographical elements illustrated in FIG. 6 (an ancestor of the counties in the state of California) may cause the visualization manager 115 to generate map visualization 500.

As described above, visualization manager 115 may generate a map visualization that includes a subset of geo-enriched data associated with a particular geographical element as well as the children geographical elements of the particular geographical element in response to a request from a client device 105 to focus on geo-enriched data associated with the particular geographical element. In some embodiments, visualization manager 115 may receive from the client device 105 a request to focus on geo-enriched data associated with a child geographical element of the particular geographical element. In response to such a request, visualization manager 115 may send hierarchy manager 120 a request for the child geographical element of the particular geographical element. After receiving the child geographical element, visualization manager 115 sends spatial query processor 125 the child geographical element, the geo-enriched data or a reference to the geo-enriched data, and a request for a subset of the geo-enriched data associated with the child geographical element. Once visualization manager 115 receives the subset of the geo-enriched data from spatial query processor 125, visualization manager 115 generates a map visualization that includes the subset of the geo-enriched data and the particular geographical element.

Figure 7:
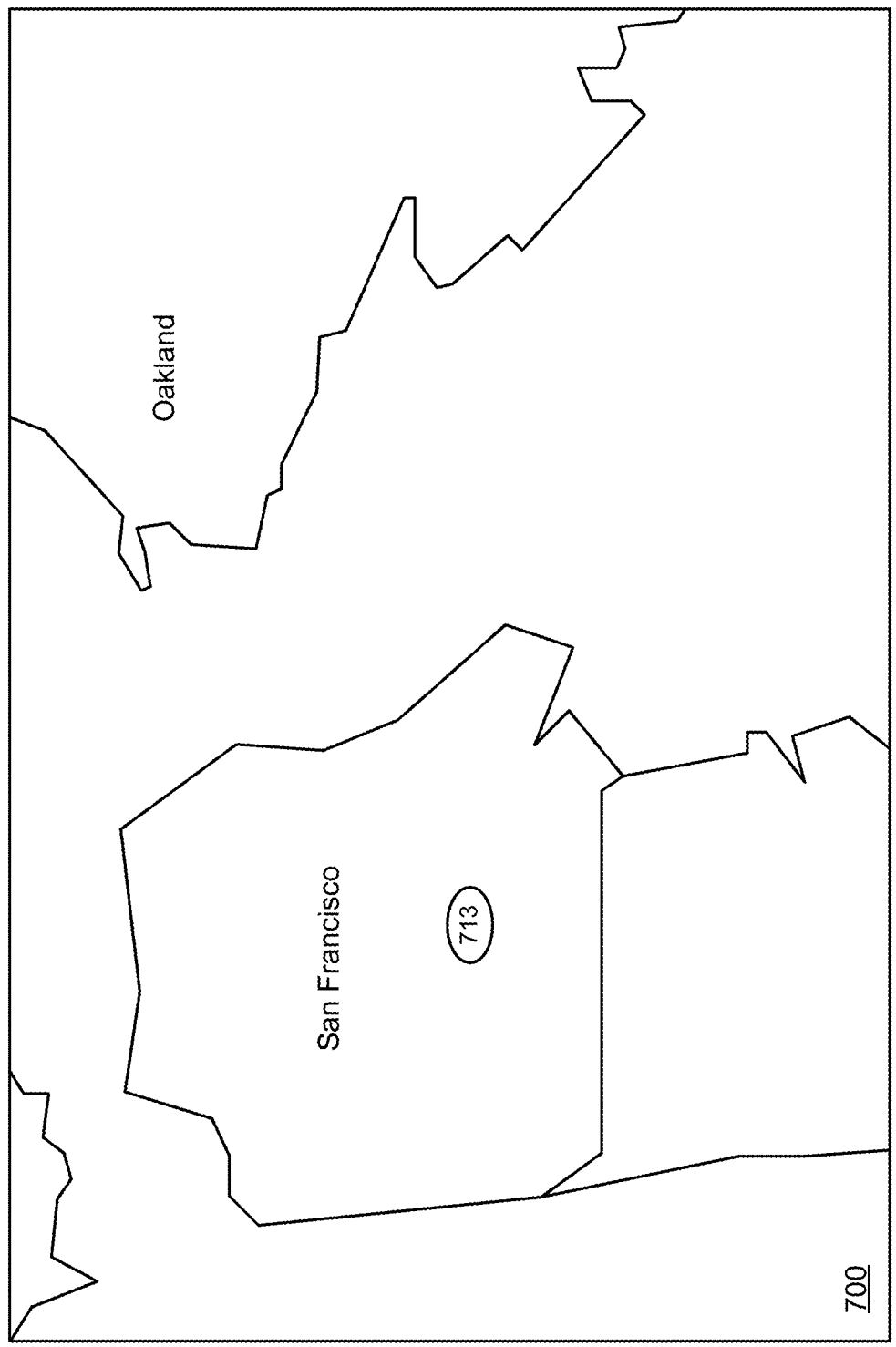
FIG. 7 illustrates an example focus operation on geo-enriched data associated with a child geographical element of the geographical element illustrated in FIG. 6 according to some embodiments.

FIG. 7 illustrates an example focus operation on geo-enriched data associated with a child geographical element of the geographical element illustrated in FIG. 6 according to some embodiments. In particular, FIG. 7 shows a map visualization 700 that focuses on the geo-enriched data associated a child geographical element of the state of California. As illustrated, map visualization 700 includes the store sales for the selected county of San Francisco. Store sales data associated with the other counties in the state of California are not included in map visualization 700.

Hierarchy manager 120 is responsible for managing hierarchies of geographical elements stored in geographical hierarchies storage 130. The hierarchies of geographical elements stored in geographical hierarchies storage 130 may include predefined hierarchies. In some instances, hierarchy manager 120 may receive (e.g., from a user of a client device 105) hierarchy definitions that hierarchy manager 120 then stores in geographical hierarchies storage 130. Hierarchy manager 120 may also receive modifications to hierarchies of geographical elements stored in geographical hierarchies storage 130. For instance, hierarchy manager 120 may receive requests to add levels to or remove levels from a hierarchy, requests to add geographical elements to or remove geographical elements from a particular level of a hierarchy, requests to modify geographical elements in a hierarchy, etc. In some embodiments, hierarchy manager 120 stores the hierarchies of geographical elements in the same or similar manner as that described above by reference to FIG. 3.

Hierarchy manager 120 may also be responsible for identifying geographical elements in a hierarchy of geographical elements. For example, hierarchy manager 120 may receive from visualization manager 115 requests for geographical elements associated with a particular level of a hierarchy. Referring to FIG. 3 as an example, hierarchy manager 120 may identify a row in table 310 having a level ID equal to the requested level (e.g., level one, level two, or level three) and send visualization manager 115 the names and geometry definitions of the geographical elements in the referenced table (e.g., table 315 for level one, table 320 for level two, or table 325 for level three) in the GE source column of the identified row.

As another example, hierarchy manager 120 may receive from visualization manager 115 requests for ancestor geographical elements of a geographical element associated with a level in a hierarchy of geographical elements. Upon receiving such a request, hierarchy manager 120 identifies geographical elements associated with a higher level in the hierarchy than the level with which the geographical element is associated. Referring to FIG. 3 as an example, hierarchy manager 120 may identify rows in table 310 having a level ID that is less (i.e., having a higher level in hierarchy 200) than the level with which the geographical element is associated and identify the geometry definitions of the geographical elements in the referenced tables (e.g., table 315 for level one, table 320 for level two, or table 325 for level three) in the GE source column of the identified rows.

Next, hierarchy manager 120 determines a set of points in the geographical element. If the geometry definition of the geographical element is a point, hierarchy manager 120 determines the point as the set of points in the geographical element. If the geometry definition of the geographical element is a line, hierarchy manager 120 determines the start point of the line, the end point of the line, the midpoint of the line, etc., or a combination thereof as the set of points in the geographical element.

If the geometry definition of the geographical element is a single polygon, hierarchy manager 120 sends spatial query processor 125 a request for the centroid of the geographical element and to determine whether the centroid is included in the geographical element. If hierarchy manager 120 receives from spatial query processor 125 an indication that the centroid is included in the geographical element, hierarchy manager 120 determines the centroid of the geographical element received from spatial query processor 125 as the set of points of the geographical element. If hierarchy manager 120 receives from spatial query processor 125 an indication that the centroid is not included in the geographical element, hierarchy manager 120 selects a defined number of points (e.g., two points, three points, five points, etc.) in the geographical element as the set of points of the geographical element.

In some embodiments, hierarchy manager 120 selects the defined number of points in a geographical element by determining the exterior ring of the geographical element (e.g., the circumference of the geographical element). Hierarchy manager 120 then defines a line from each vertex of the exterior ring to the centroid of the geographical element. Next, hierarchy manager 120 determines the lines that intersect with the geographical element. From such lines, hierarchy manager 120 selects a defined number (e.g., one, two, three, five, etc.) lines. In some embodiments, hierarchy manager 120 selects the lines having the longest length. Finally, hierarchy manager 120 determines the midpoint of each of the selected lines as the set of points of the geographical element.

If the geometry definition of the geographical element is a multi-polygon, hierarchy manager 120 sends spatial query processor 125 a request for the centroid of the largest polygon in the multi-polygon and to determine whether the centroid is included in the largest polygon. If hierarchy manager 120 receives from spatial query processor 125 an indication that the centroid of the largest polygon is included in the largest polygon, hierarchy manager 120 determines the centroid of the largest polygon received from spatial query processor 125 as the set of points of the geographical element. If hierarchy manager 120 receives from spatial query processor 125 an indication that the centroid of the largest polygon is not included in the largest polygon, hierarchy manager 120 selects a defined number of points (e.g., two points, three points, five points, etc.) in the largest polygon as the set of points of the geographical element. Hierarchy manager 120 may select the defined number of points in the largest geographical element in the same or similar manner as that described above for the geographical element is a single polygon.

After determining the set of points in the geographical element, hierarchy manager 120 sends spatial query processor 125 a request for geographical elements in the geographical elements associated with a higher level in the hierarchy than the level with which the geographical element is associated that contain the set of points in the geographical element. Hierarchy manager 120 determines the geographical elements received from spatial query processor 125 in response to such a request as the ancestor geographical elements of the geographical element.

As yet another example, hierarchy manager 120 may also receive from visualization manager 115 requests for descendant geographical elements of a geographical element. When receiving such a request, hierarchy manager 120 identifies geographical elements associated with a lower level in the hierarchy than the level with which the geographical element is associated. Referring to FIG. 3 as an example, hierarchy manager 120 may identify rows in table 310 having a level ID that is greater (i.e., having a lower level in hierarchy 200) than the level with which the geographical element is associated and identify the geometry definitions of the geographical elements in the referenced tables (e.g., table 315 for level one, table 320 for level two, or table 325 for level three) in the GE source column of the identified rows.

In some embodiments, hierarchy manager 120 then sends spatial query processor 125 a request for geographical elements in the geographical elements associated with a lower level in the hierarchy than the level with which the geographical element is associated that are contained by the geographical element. Hierarchy manager 120 determines the geographical elements received from spatial query processor 125 in response to such a request as the descendant geographical elements of the geographical element.

In other embodiments, hierarchy manager 120 determines a set of points in each of the geographical elements associated with a lower level in the hierarchy than the level with which the geographical element is associated in the same or similar manner as that described above by reference to determining ancestor geographical elements of a geographical element. In some such other embodiments, hierarchy manager 120 sends spatial query processor 125 a request for geographical elements in the geographical elements associated with a lower level in the hierarchy than the level with which the geographical element is associated having a determined set of points contained by the geographical element. Hierarchy manager 120 determines the geographical elements received from spatial query processor 125 in response to such a request as the descendant geographical elements of the geographical element.

Spatial query processor 125 is configured to perform spatial operations on data that includes spatial data (e.g., geo-enriched data). For example, spatial query processor 125 may receive from visualization manager 115 a geographical element, geo-enriched data or a reference to the geo-enriched data, and a request for a subset of the geo-enriched data associated with the geographical element. If spatial query processor 125 receives a reference to the geo-enriched data, spatial query processor 125 accesses geo-enriched data storage 135 and retrieves the geo-enriched. The geographical element may be a geometry definition of the geographical element (e.g., an ST_point, an ST_curve, an ST_polygon, etc.).

In some embodiments, spatial query processor 125 determines the subset of the geo-enriched data associated by performing a spatial join operation between the geometry of the geographical element and the spatial data of the geo-enriched data. A spatial join operation compares, in some embodiments, a first set of spatial data with a second set of spatial data and identifies spatial data in the second set of spatial data that satisfy a type of spatial relationship with spatial data in the first set of spatial data. Example types of spatial relationships include a first spatial data contains a second spatial data, a first spatial data intersects a second spatial data, a first spatial data covers a second spatial data, etc. Once spatial query processor 125 performs a spatial join operation between the geographical element and the geo-enriched data to determine the subset of the geo-enriched data, spatial query processor 125 sends visualization manager 115 the determined subset of geo-enriched data.

Spatial query processor 125 may receive requests to perform spatial operations from hierarchy manager 120. For instance, spatial query processor 125 may receive from hierarchy manager 120 requests for centroids of geographical elements, requests to determine whether a centroid of a geographical element is contained in the geographical element, requests for the largest polygon of a multi-polygon, requests to determine whether any geographical elements of a set of geographical elements intersect or contain a particular geographical element, etc.

For a request for a centroid of a geographical element, spatial query processor 125 calculates the centroid using a known technique and returns the centroid (e.g., an ST_point) to hierarchy manager 120. For requests to determine whether a centroid of a geographical element is contained in the geographical element, spatial query processor 125 performs a spatial operation that determines whether a first geometry contains a second geometry and sends hierarchy manager 120 the result of the determination (e.g., the first geometry does contain the second geometry or the first geometry does not contain the second geometry). For requests for the largest polygon of a multi-polygon, spatial query processor 125 calculates the area of each polygon in the multi-polygon and selects the polygon with the largest area as the largest polygon in the multi-polygon. For requests to determine whether any geographical elements intersect or contain a particular geographical element, spatial query processor 125 performs a spatial join between the set of geographical elements and the particular geographical element in the same or similar manner described above. If any geographical elements are determined to intersect or contain the particular geographical element, spatial query processor 125 sends hierarchy manager 120 those geographical elements.

In some embodiments, map-based system 110 is implemented on a cloud computing system as described below by reference to FIG. 14. The cloud computing system may include (e.g., host) applications and/or services that may be accessed by client devices 105*a*-*n*. In some such embodiments, visualization manager 115 receives requests from such applications and/or services for map visualizations. These applications and/or services send requests to visualization manager 115 in response to a user of a client device 105 interacting (e.g., through a web browser operating on the client device 105) with the applications and/or services. Accordingly, visualization manager 115 sends the requested map visualizations to the requesting applications and/or services for the applications and/or services to provide the map visualizations to the client device 105. Examples of such applications and/or services include analytics applications that map geo-enriched data on map visualizations.

Figure 8:
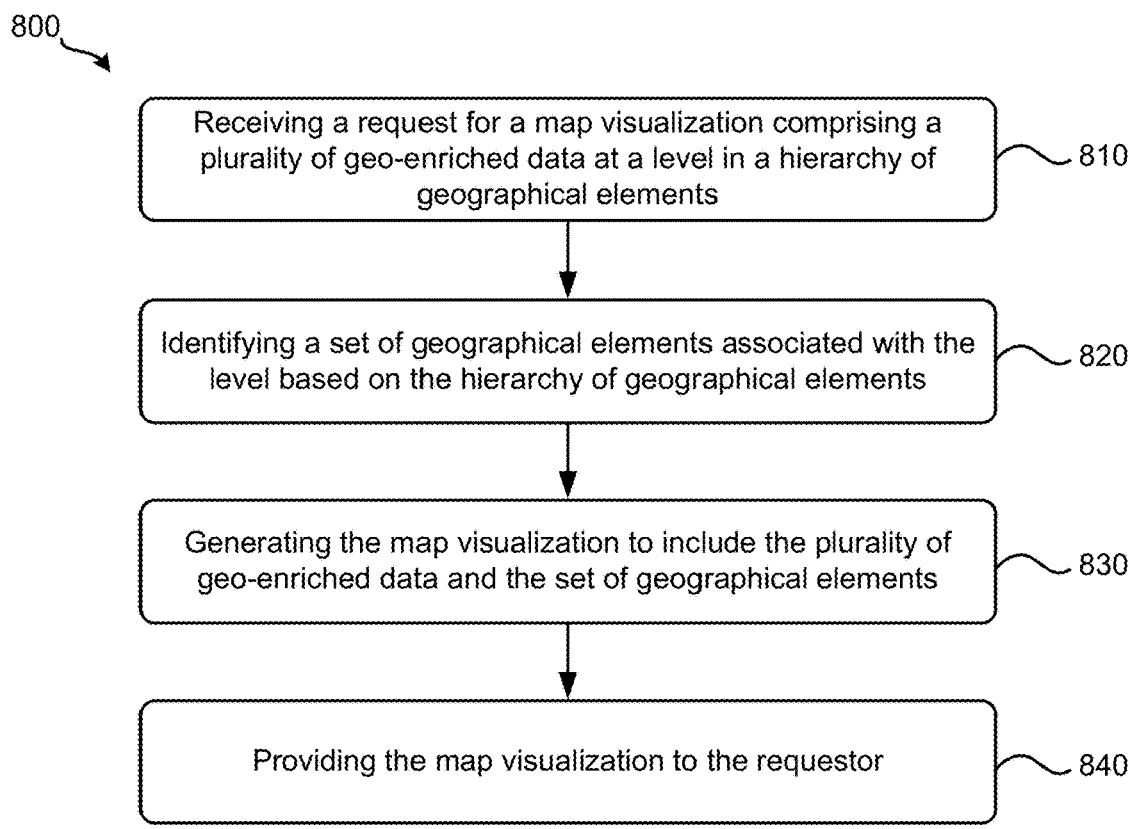
FIG. 8 illustrates a process for providing a map visualization according to some embodiments.

FIG. 8 illustrates a process 800 for providing a map visualization according to some embodiments. In some embodiments, map-based visualization system 110 performs process 800. Process 800 begins by receiving, at 810, a request for a map visualization that includes geo-enriched data and geographical elements associated with a level of a plurality of levels in a hierarchy of geographical elements. Referring to FIG. 2 as an example, process 800 may receive a request for a map visualization that includes geo-enriched data and geographical elements associated with level three in hierarchy 200. In some embodiments, process 800 receives the request from a client device 105.

Next, process 800 identifies, at 820, a set of geographical elements associated with the level based on the hierarchy of geographical elements. Continuing with the example above and referring to FIG. 3, process 800 may identify the third row in table 310 since that row has a level ID equal to the third level in hierarchy 200 Process 800 then generates, at 830, a map visualization that includes the geo-enriched data and the set of geographical elements and then provides, at 840, the map visualization to the requestor.

Figure 9:
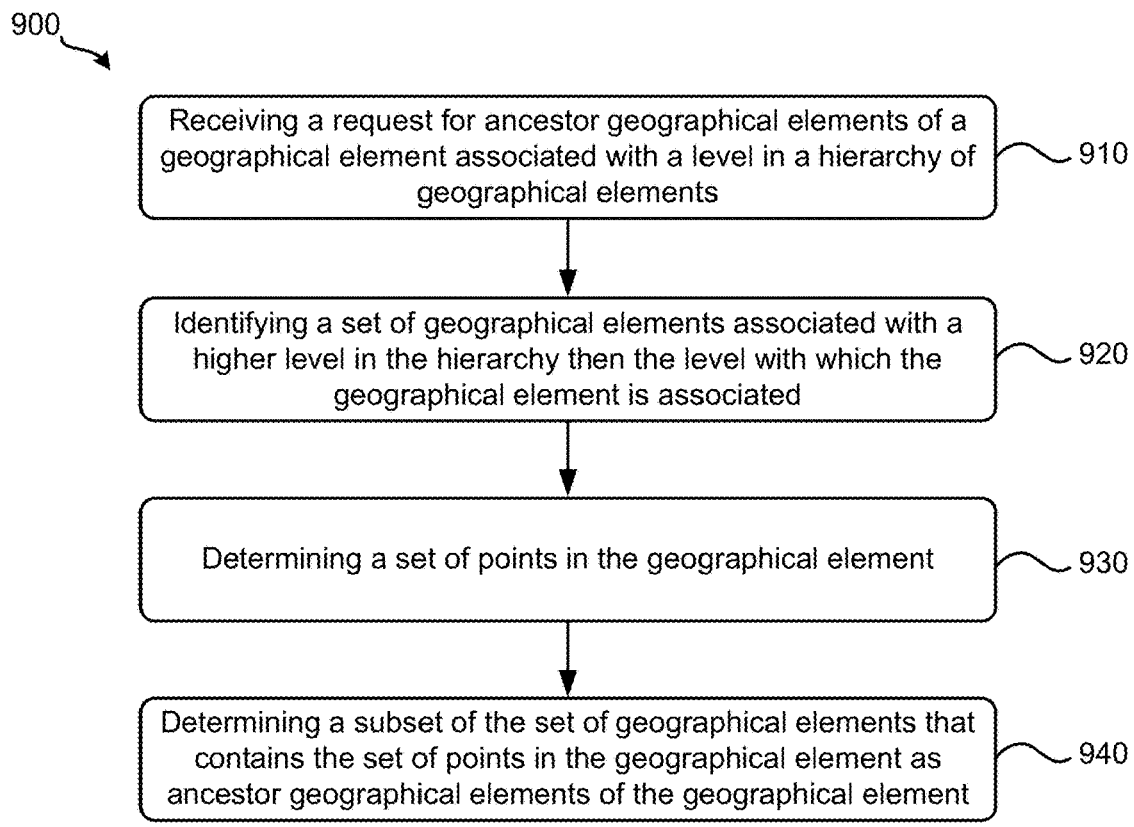
FIG. 9 illustrates a process for determining ancestor geographical elements of a geographical element according to some embodiments.

FIG. 9 illustrates a process 900 for determining ancestor geographical elements of a geographical element according to some embodiments. In some embodiments, hierarchy manager 120 performs process 900. Process 900 starts by receiving, at 910, a request for ancestor geographical elements of a geographical element associated with a level in a hierarchy of geographical elements. Referring to FIG. 2 as an example, process 900 may receive a request for ancestor geographical elements of the San Francisco geographical element in hierarchy 200.

Next, process 900 identifies, at 920, a set of geographical elements associated with a higher level in hierarchy than the level with which the geographical element is associated. Continuing with the example above and referring to FIG. 3, process 900 may identify the set of geographical elements by identifying the first two rows in table 310 since those rows have a level ID that is less (i.e., having a higher level in hierarchy 200) than the level with which the San Francisco geographical element is associated.

Process 900 then determines, at 930, a set of points in the geographical element. Finally, process 900 determines, at 940, a subset of the set of geographical elements that contains the set of points in geographical element as ancestor geographical elements of the geographical element.

Figure 10A:
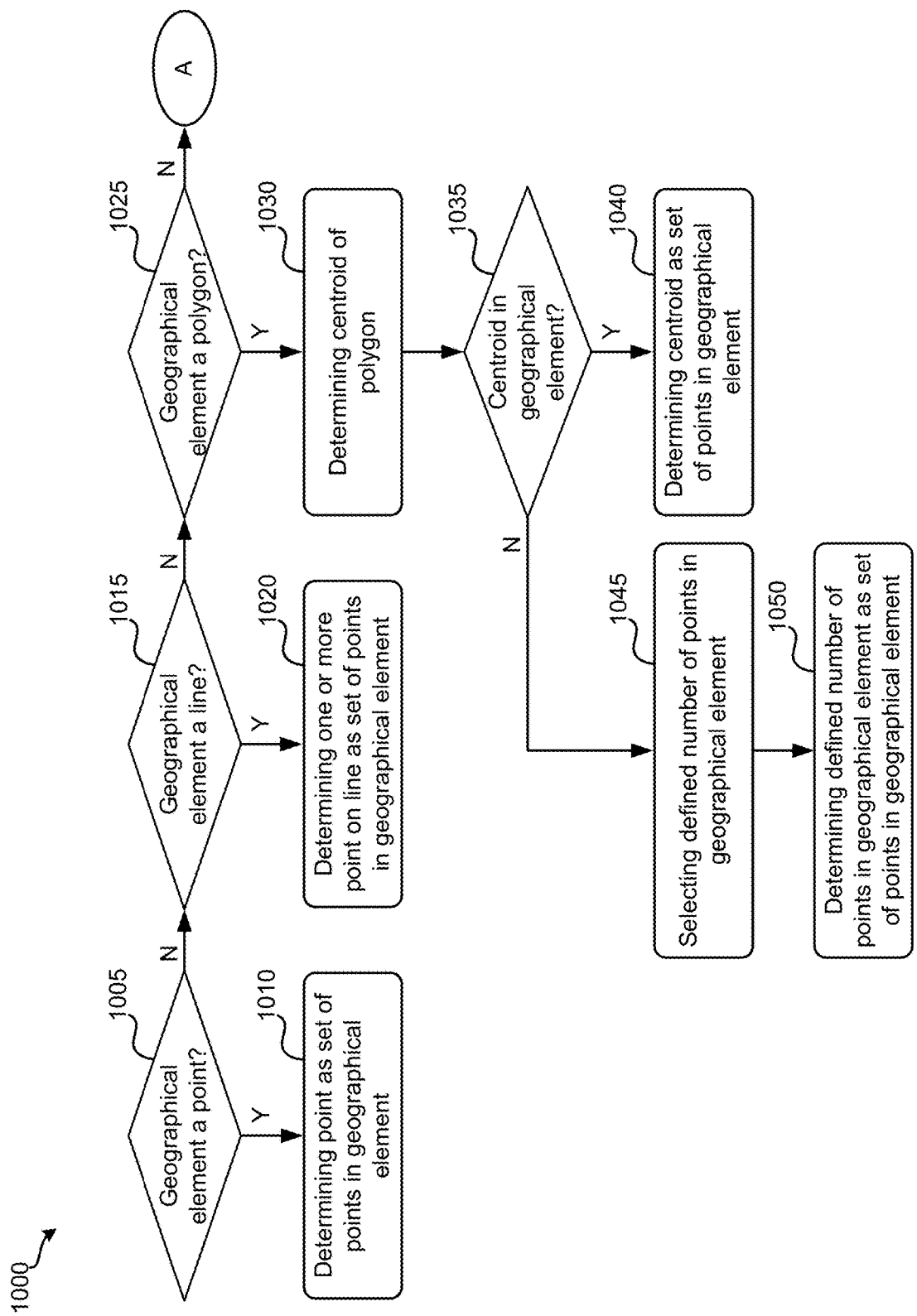
FIGS. 10A and 10B illustrate a process for determining a set of points in a geographical element according to some embodiments.
Figure 10B:
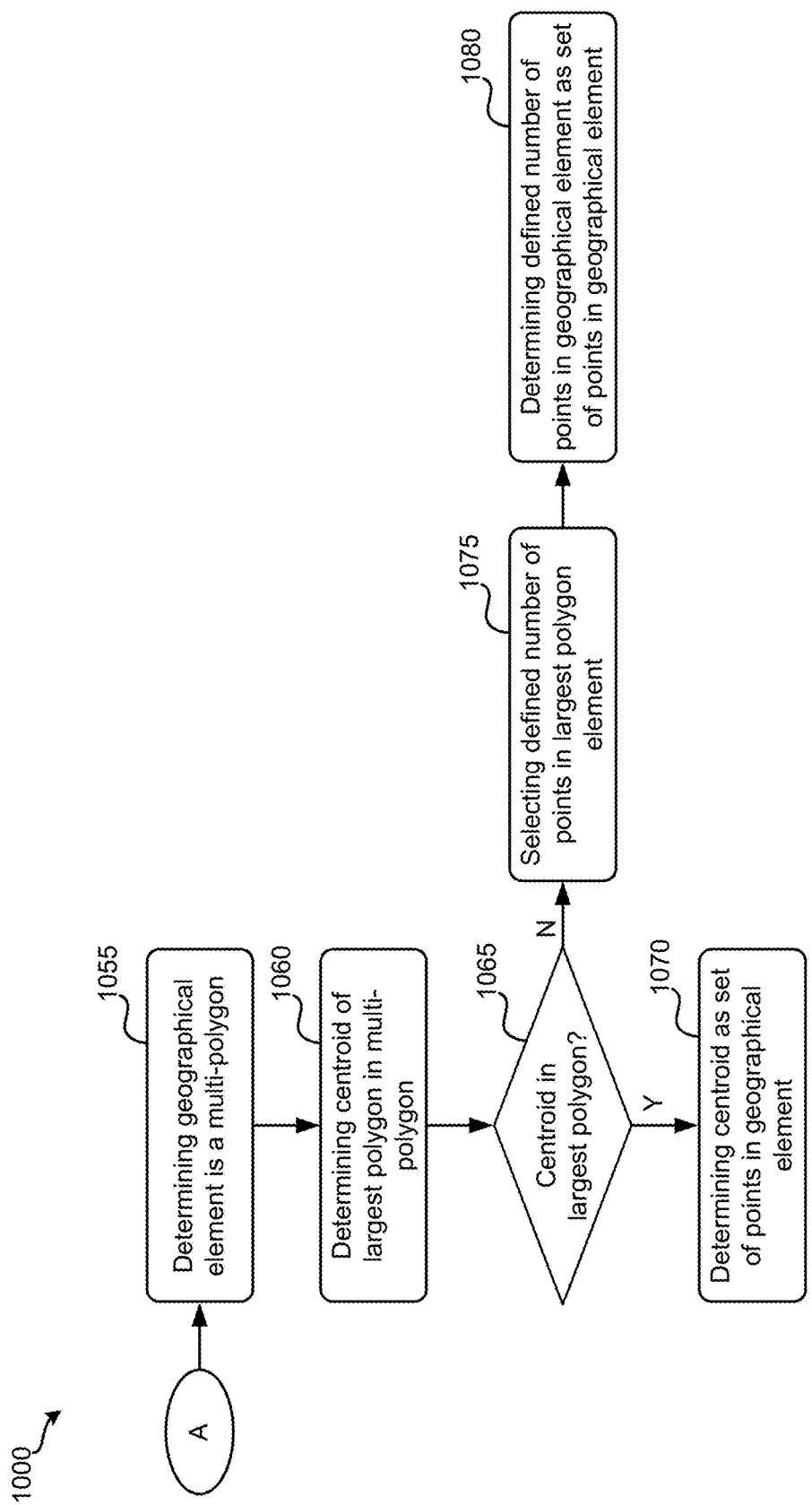

FIGS. 10A and 10B illustrate a process 1000 for determining a set of points in a geographical element according to some embodiments. In some embodiments, hierarchy manager 120 performs process 1000 as part of performing operation 930 of process 900. Referring to FIG. 10A, process 1000 begins by determining, at 1005, whether a geometry definition of a geographical element is a point. If so, process 1000 determines, at 1010, the point as the set of points in the geographical element. Otherwise, process 1000 determines, at 1015, whether the geometry definition of the geographical element is a line. If so, process 1000 determines, at 1020, one or more points on the line (e.g., the start point of the line, the end point of the line, the midpoint of the line, etc., or a combination thereof) as the set of points in the geographical element.

If the geometry definition of the geographical element is not a line, process 1000 determines, at 1025, whether the geometry definition of the geographical element is a single polygon. If so, process 1000 determines, at 1030, a centroid of the geographical element and then determines, at 1035, whether the centroid is included in the geographical element. In some embodiments, process 1000 makes such determinations by sending spatial query processor 125 a request for the centroid of the geographical element and to determine whether the centroid is included in the geographical element. If the centroid is included in the geographical element, process 1000 determines, at 1040, the centroid of the geographical element as the set of points of the geographical element. If the centroid is not included in the geographical element, process 1000 selects, at 1045, a defined number of points (e.g., two points, three points, five points, etc.) in the geographical element and determines, at 1050, the defined number of points as the set of points of the geographical element.

If the geometry definition of the geographical element is not a single polygon, process 1000 determines, at 1055, that the geometry definition of the geographical element is a multi-polygon. Process 1000 then determines, at 1060, a centroid of the largest polygon in the multi-polygon and determines, at 1065, whether the centroid is include in the largest polygon. In some embodiments, process 1000 makes such determinations by sending spatial query processor 125 a request for the centroid of the largest polygon in the multi-polygon and to determine whether the centroid is included in the largest polygon.

If the centroid of the largest polygon is included in the largest polygon, process 1000 determines, at 1070, the centroid of the largest polygon as the set of points of the geographical element. If the centroid of the largest polygon is not included in the largest polygon, process 1000 selects, at 1075, a defined number of points (e.g., two points, three points, five points, etc.) in the largest polygon and determines, at 1080, the defined number of points as the set of points of the geographical element.

Figure 11:
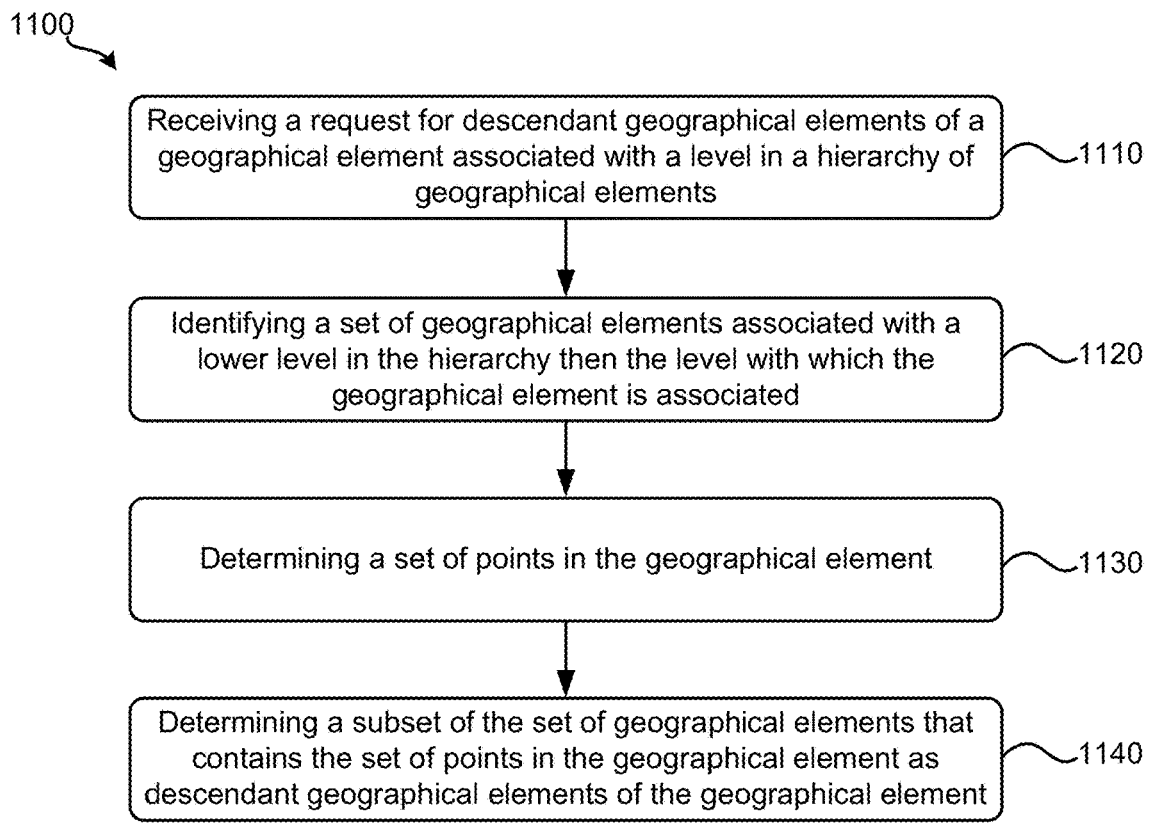
FIG. 11 illustrates a process for determining descendant geographical elements of a geographical element according to some embodiments.

FIG. 11 illustrates a process 1100 for determining descendant geographical elements of a geographical element according to some embodiments. In some embodiments, hierarchy manager 120 performs process 1100. Process 1100 starts by receiving, at 1110, a request for descendant geographical elements of a geographical element associated with a level in a hierarchy. Referring to FIG. 2 as an example, process 1100 may receive a request for an ancestor path of the California geographical element in hierarchy 200.

Next, process 1100 identifies, at 1120, a set of geographical elements associated with a lower level in hierarchy than the level with which the geographical element is associated. Continuing with the example above and referring to FIG. 3, process 1100 may identify the set of geographical elements by identifying the last row in table 310 since that row has a level ID that is greater (i.e., having a lower level in hierarchy 200) than the level with which the California geographical element is associated.

Process 1100 then determines, at 1130, a set of points for each geographical element in the set of geographical elements. In some embodiments, process 1100 performs process 1000 to determine the set of points in a geographical element. Finally, process 1100 determines, at 1140, a subset of the set of geographical elements that have sets of points contained by the geographical element as the descendant geographical elements of the geographical element.

Figure 12:
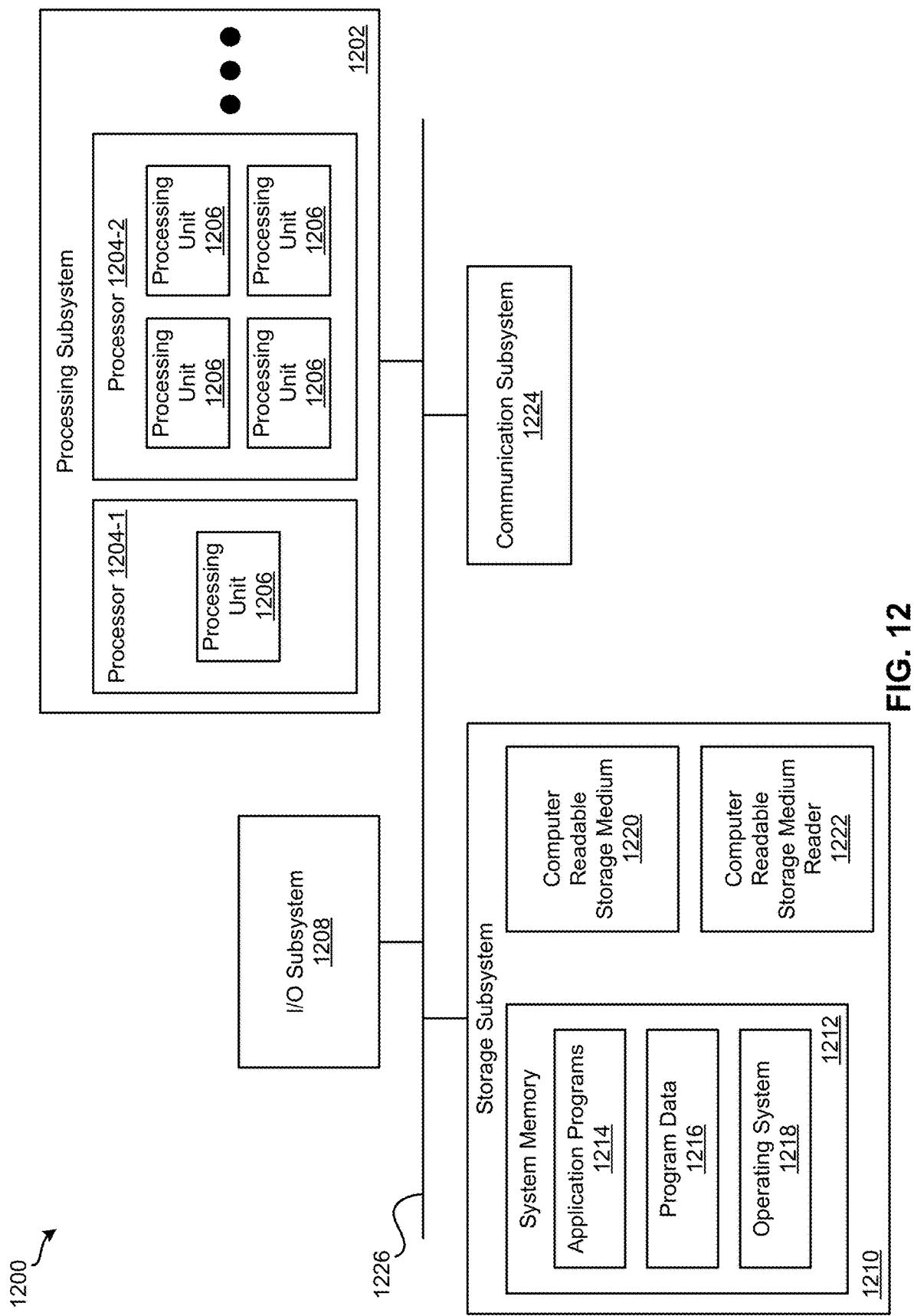
FIG. 12 illustrates an exemplary computer system, in which various embodiments may be implemented.

FIG. 12 illustrates an exemplary computer system 1200, in which various embodiments may be implemented. For example, computer system 1200 may be used to implement client devices 105*a*-*n* and/or map-based visualization system 110. Computer system 1200 may be a desktop computer, a laptop, a server computer, or any other type of computer system or combination thereof. In addition, computer system 1200 can implement many of the operations, methods, and/or processes described above (e.g., processes 800, 900, 1000, and 1100). As shown in FIG. 12, computer system 1200 includes processing subsystem 1202, which communicates, via bus subsystem 1226, with input/output (I/O) subsystem 1208, storage subsystem 1210 and communication subsystem 1224.

Bus subsystem 1226 is configured to facilitate communication among the various components and subsystems of computer system 1200. While bus subsystem 1226 is illustrated in FIG. 12 as a single bus, one of ordinary skill in the art will understand that bus subsystem 1226 may be implemented as multiple buses. Bus subsystem 1226 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1202, which can be implemented as one or more integrated circuits (e.g., a conventional microprocessor or microcontroller), controls the operation of computer system 1200. Processing subsystem 1202 may include one or more processors 1204. Each processor 1204 may include one processing unit 1206 (e.g., a single core processor such as processor 1204-1) or several processing units 1206 (e.g., a multicore processor such as processor 1204-2). In some embodiments, processors 1204 of processing subsystem 1202 may be implemented as independent processors while, in other embodiments, processors 1204 of processing subsystem 1202 may be implemented as multiple processors integrate into a single chip or multiple chips. Still, in some embodiments, processors 1204 of processing subsystem 1202 may be implemented as a combination of independent processors and multiple processors integrated into a single chip or multiple chips.

In some embodiments, processing subsystem 1202 can execute a variety of programs or processes in response to program code and can maintain multiple concurrently executing programs or processes. At any given time, some or all of the program code to be executed can reside in processing subsystem 1202 and/or in storage subsystem 1210. Through suitable programming, processing subsystem 1202 can provide various functionalities, such as the functionalities described above by reference to processes 800, 900, 1000, 1100, etc.

I/O subsystem 1208 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1200 to a user or another device (e.g., a printer).

As illustrated in FIG. 12, storage subsystem 1210 includes system memory 1212, computer-readable storage medium 1220, and computer-readable storage medium reader 1222. System memory 1212 may be configured to store software in the form of program instructions that are loadable and executable by processing subsystem 1202 as well as data generated during the execution of program instructions. In some embodiments, system memory 1212 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1212 may include different types of memory, such as static random access memory (SRAM) and/or dynamic random access memory (DRAM). System memory 1212 may include a basic input/output system (BIOS), in some embodiments, that is configured to store basic routines to facilitate transferring information between elements within computer system 1200 (e.g., during start-up). Such a BIOS may be stored in ROM (e.g., a ROM chip), flash memory, or any other type of memory that may be configured to store the BIOS.

As shown in FIG. 12, system memory 1212 includes application programs 1214, program data 1216, and operating system (OS) 1218. OS 1218 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1220 may be a non-transitory computer-readable medium configured to store software (e.g., programs, code modules, data constructs, instructions, etc.). Many of the components (e.g., visualization manager 115, hierarchy manager 120, and spatial query processor 125) and/or processes (e.g., processes 800, 900, 1000, and 1100) described above may be implemented as software that when executed by a processor or processing unit (e.g., a processor or processing unit of processing subsystem 1202) performs the operations of such components and/or processes. Storage subsystem 1210 may also store data used for, or generated during, the execution of the software.

Storage subsystem 1210 may also include computer-readable storage medium reader 1222 that is configured to communicate with computer-readable storage medium 1220. Together and, optionally, in combination with system memory 1212, computer-readable storage medium 1220 may comprehensively represent remote, local, fixed, and/or removable storage devices plus storage media for temporarily and/or more permanently containing, storing, transmitting, and retrieving computer-readable information.

Computer-readable storage medium 1220 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1224 serves as an interface for receiving data from, and transmitting data to, other devices, computer systems, and networks. For example, communication subsystem 1224 may allow computer system 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1224 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1224 may provide components configured for wired communication (e.g., Ethernet) in addition to or instead of components configured for wireless communication.

One of ordinary skill in the art will realize that the architecture shown in FIG. 12 is only an example architecture of computer system 1200, and that computer system 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
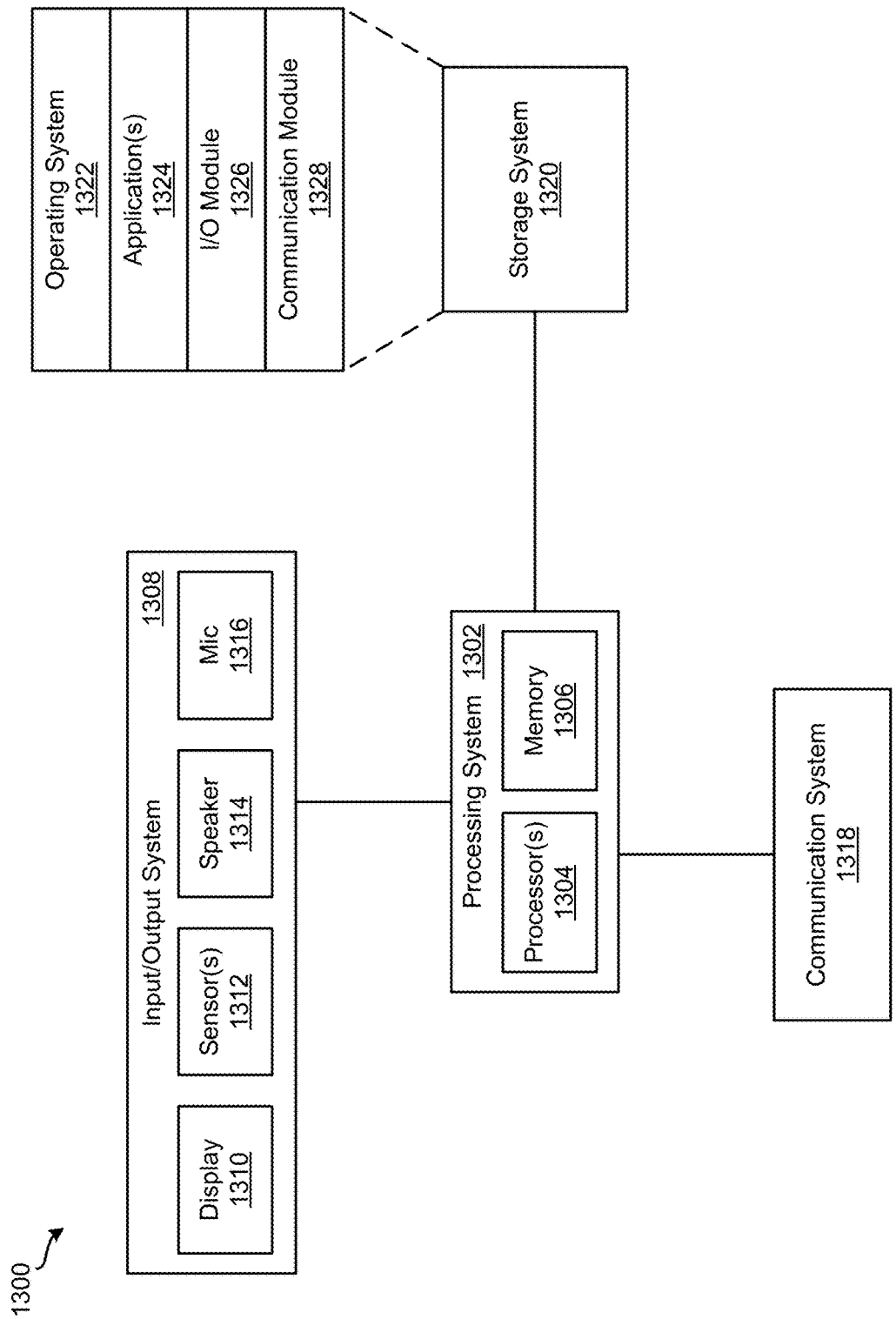
FIG. 13 illustrates an exemplary computing device, in which various embodiments may be implemented.

FIG. 13 illustrates an exemplary computing device 1300, in which various embodiments may be implemented. For example, computing device 1300 may be used to implement computing devices 105*a-n*. Computing device 1300 may be a cellphone, a smartphone, a wearable device, an activity tracker or manager, a tablet, a personal digital assistant (PDA), a media player, or any other type of mobile computing device or combination thereof. As shown in FIG. 13, computing device 1300 includes processing system 1302, input/output (I/O) system 1308, communication system 1318, and storage system 1320. These components may be coupled by one or more communication buses or signal lines.

Processing system 1302, which can be implemented as one or more integrated circuits (e.g., a conventional microprocessor or microcontroller), controls the operation of computing device 1300. As shown, processing system 1302 includes one or more processors 1304 and memory 1306. Processors 1304 are configured to run or execute various software and/or sets of instructions stored in memory 1306 to perform various functions for computing device 1300 and to process data.

Each processor of processors 1304 may include one processing unit (e.g., a single core processor) or several processing units (e.g., a multicore processor). In some embodiments, processors 1304 of processing system 1302 may be implemented as independent processors while, in other embodiments, processors 1304 of processing system 1302 may be implemented as multiple processors integrate into a single chip. Still, in some embodiments, processors 1304 of processing system 1302 may be implemented as a combination of independent processors and multiple processors integrated into a single chip.

Memory 1306 may be configured to receive and store software (e.g., operating system 1322, applications 1324, I/O module 1326, communication module 1328, etc. from storage system 1320) in the form of program instructions that are loadable and executable by processors 1304 as well as data generated during the execution of program instructions. In some embodiments, memory 1306 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1308 is responsible for receiving input through various components and providing output through various components. As shown for this example, I/O system 1308 includes display 1310, one or more sensors 1312, speaker 1314, and microphone 1316. Display 1310 is configured to output visual information (e.g., a graphical user interface (GUI) generated and/or rendered by processors 1304). In some embodiments, display 1310 is a touch screen that is configured to also receive touch-based input. Display 1310 may be implemented using liquid crystal display (LCD) technology, light-emitting diode (LED) technology, organic LED (OLED) technology, organic electro luminescence (OEL) technology, or any other type of display technologies. Sensors 1312 may include any number of different types of sensors for measuring a physical quantity (e.g., temperature, force, pressure, acceleration, orientation, light, radiation, etc.). Speaker 1314 is configured to output audio information and microphone 1316 is configured to receive audio input. One of ordinary skill in the art will appreciate that I/O system 1308 may include any number of additional, fewer, and/or different components. For instance, I/O system 1308 may include a keypad or keyboard for receiving input, a port for transmitting data, receiving data and/or power, and/or communicating with another device or component, an image capture component for capturing photos and/or videos, etc.

Communication system 1318 serves as an interface for receiving data from, and transmitting data to, other devices, computer systems, and networks. For example, communication system 1318 may allow computing device 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1318 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1318 may provide components configured for wired communication (e.g., Ethernet) in addition to or instead of components configured for wireless communication.

Storage system 1320 handles the storage and management of data for computing device 1300. Storage system 1320 may be implemented by one or more non-transitory machine-readable mediums that are configured to store software (e.g., programs, code modules, data constructs, instructions, etc.) and store data used for, or generated during, the execution of the software.

In this example, storage system 1320 includes operating system 1322, one or more applications 1324, I/O module 1326, and communication module 1328. Operating system 1322 includes various procedures, sets of instructions, software components and/or drivers for controlling and managing general system tasks (e.g., memory management, storage device control, power management, etc.) and facilitates communication between various hardware and software components. Operating system 1322 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1324 can include any number of different applications installed on computing device 1300. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1326 manages information received via input components (e.g., display 1310, sensors 1312, and microphone 1316) and information to be outputted via output components (e.g., display 1310 and speaker 1314). Communication module 1328 facilitates communication with other devices via communication system 1318 and includes various software components for handling data received from communication system 1318.

One of ordinary skill in the art will realize that the architecture shown in FIG. 13 is only an example architecture of computing device 1300, and that computing device 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
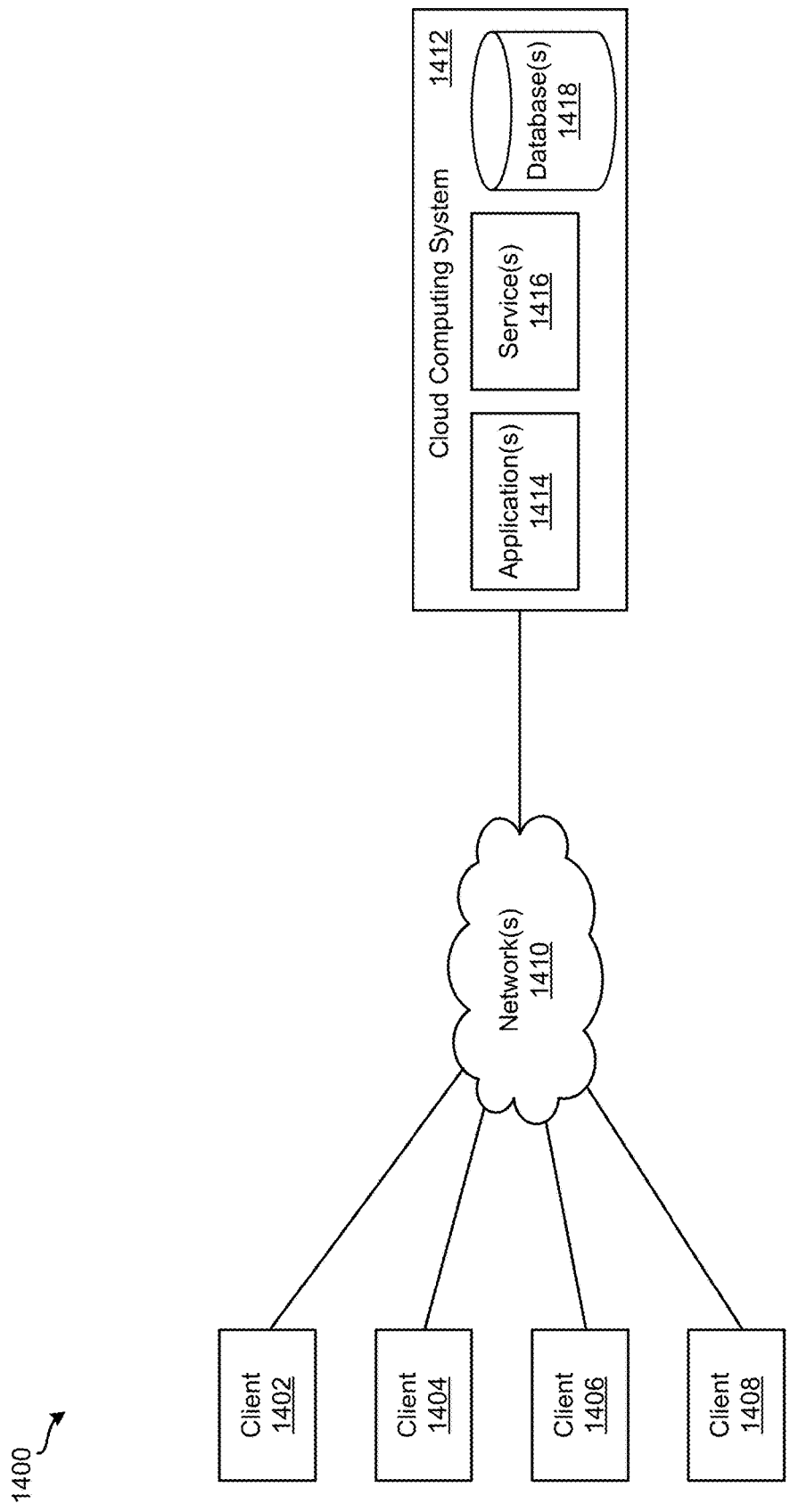
FIG. 14 illustrates system for implementing various embodiments described above.

FIG. 14 illustrates system 1400 for implementing various embodiments described above. For example, cloud computing system 1412 of system 1400 may be used to implement map-based visualization system 110. As shown, system 1400 includes client devices 1402-1408, one or more networks 1410, and cloud computing system 1412. Cloud computing system 1412 is configured to provide resources and data to client devices 1402-1408 via networks 1410. In some embodiments, cloud computing system 1400 provides resources to any number of different users (e.g., customers, tenants, organizations, etc.). Cloud computing system 1412 may be implemented by one or more computer systems (e.g., servers), virtual machines operating on a computer system, or a combination thereof.

As shown, cloud computing system 1412 includes one or more applications 1414, one or more services 1416, and one or more databases 1418. Cloud computing system 1400 may provide applications 1414, services 1416, and databases 1418 to any number of different customers in a self-service, subscription-based, elastically scalable, reliable, highly available, and secure manner.

In some embodiments, cloud computing system 1400 may be adapted to automatically provision, manage, and track a customer's subscriptions to services offered by cloud computing system 1400. Cloud computing system 1400 may provide cloud services via different deployment models. For example, cloud services may be provided under a public cloud model in which cloud computing system 1400 is owned by an organization selling cloud services and the cloud services are made available to the general public or different industry enterprises. As another example, cloud services may be provided under a private cloud model in which cloud computing system 1400 is operated solely for a single organization and may provide cloud services for one or more entities within the organization. The cloud services may also be provided under a community cloud model in which cloud computing system 1400 and the cloud services provided by cloud computing system 1400 are shared by several organizations in a related community. The cloud services may also be provided under a hybrid cloud model, which is a combination of two or more of the aforementioned different models.

In some instances, any one of applications 1414, services 1416, and databases 1418 made available to client devices 1402-1408 via networks 1410 from cloud computing system 1400 is referred to as a "cloud service." Typically, servers and systems that make up cloud computing system 1400 are different from the on-premises servers and systems of a customer. For example, cloud computing system 1400 may host an application and a user of one of client devices 1402-1408 may order and use the application via networks 1410.

Applications 1414 may include software applications that are configured to execute on cloud computing system 1412 (e.g., a computer system or a virtual machine operating on a computer system) and be accessed, controlled, managed, etc. via client devices 1402-1408. In some embodiments, applications 1414 may include server applications and/or mid-tier applications (e.g., HTTP (hypertext transport protocol) server applications, FTP (file transfer protocol) server applications, CGI (common gateway interface) server applications, JAVA server applications, etc.). Services 1416 are software components, modules, application, etc. that are configured to execute on cloud computing system 1412 and provide functionalities to client devices 1402-1408 via networks 1410. Services 1416 may be web-based services or on-demand cloud services.

Databases 1418 are configured to store and/or manage data that is accessed by applications 1414, services 1416, and/or client devices 1402-1408. For instance, storages 130 and 135 may be stored in databases 1418. Databases 1418 may reside on a non-transitory storage medium local to (and/or resident in) cloud computing system 1412, in a storage-area network (SAN), on a non-transitory storage medium local located remotely from cloud computing system 1412. In some embodiments, databases 1418 may include relational databases that are managed by a relational database management system (RDBMS). Databases 1418 may be a column-oriented databases, row-oriented databases, or a combination thereof. In some embodiments, some or all of databases 1418 are in-memory databases. That is, in some such embodiments, data for databases 1418 are stored and managed in memory (e.g., random access memory (RAM)).

Client devices 1402-1408 are configured to execute and operate a client application (e.g., a web browser, a proprietary client application, etc.) that communicates with applications 1414, services 1416, and/or databases 1418 via networks 1410. This way, client devices 1402-1408 may access the various functionalities provided by applications 1414, services 1416, and databases 1418 while applications 1414, services 1416, and databases 1418 are operating (e.g., hosted) on cloud computing system 1400. Client devices 1402-1408 may be computer system 1400 or computing device 1100, as described above by reference to FIGS. 12 and 13, respectively. Although system 1400 is shown with four client devices, any number of client devices may be supported.

Networks 1410 may be any type of network configured to facilitate data communications among client devices 1402-1408 and cloud computing system 1412 using any of a variety of network protocols. Networks 1410 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving a request for a map visualization comprising a plurality of geo-enriched data and a set of geographical elements associated with a level of a plurality of levels in a hierarchy of geographical elements, wherein the plurality of geo-enriched data comprises a first plurality of spatial data to which a plurality of location data is converted, wherein each location data in the plurality of location data describes a location, area, or region, wherein each spatial data in the first plurality of spatial data defines a geometry of the location, area, or region described by a corresponding location data in the plurality of location data, wherein the set of geographical elements associated with the level of the plurality of levels in the hierarchy of geographical elements comprises a second plurality of spatial data, wherein each spatial data in the second plurality of spatial data defines a geometry that represents a corresponding geographical element in the set of geographical elements associated with the level of the plurality of levels in the hierarchy of geographical elements;

accessing a first table to identify a row in the first table that corresponds to the level in the hierarchy of geographical elements;

accessing a second table referred to by a reference to the second table stored in a field of the identified row in the first table to identify the set of geographical elements associated with the level, wherein the second table comprises the set of geographical elements associated with the level and the second plurality of spatial data; and generating the map visualization to include the plurality of geo-enriched data and the set of geographical elements, wherein the geometry of each geo-enriched data in the plurality of geo-enriched data is included within the geometry defined by spatial data in the second plurality of spatial data that represents a corresponding geographical element in the set of geographical elements.

2. The non-transitory machine-readable medium of claim 1, wherein the program further comprises a set of instructions for providing the map visualizations to a client device for the client device to display on a display of the client device.

3. The non-transitory machine-readable medium of claim 1, wherein the request is a first request, wherein the program further comprises sets of instructions for:
- receiving a second request to focus on a geographical element in the set of geographical elements, the second request comprising a selection of the geographical element;
- performing a set of spatial operations based on the plurality of geo-enriched data and the geographical element to identify a subset of the plurality of geo-enriched data associated with the geographical element; and
- generating the map visualization to include the subset of geo-enriched data and the geographical element and not include geo-enriched data having geometries that are included in the geometries defined by geographical elements in the set of geographical elements other than the geographical element.

4. The non-transitory machine-readable medium of claim 3, wherein the program further comprises a set of instructions for determining a set of ancestor geographical elements of the geographical element based on the hierarchy of geographical elements.

5. The non-transitory machine-readable medium of claim 4, wherein the set of spatial operations is a first set of spatial operations, wherein the subset of the plurality of geo-enriched data is a first subset of the plurality of geo-enriched data, wherein the program further comprises sets of instructions for:
- receiving a third request to focus on an ancestor geographical element in the set of ancestor geographical elements, the third request comprising a selection of the ancestor geographical element;
- performing a second set of spatial operations based on the plurality of geo-enriched data and the ancestor geographical element to identify a second subset of the plurality of geo-enriched data associated with the ancestor geographical element; and
- generating the map visualization to include the second subset of geo-enriched data and the ancestor geographical element.

6. The non-transitory machine-readable medium of claim 3, wherein the set of spatial operations is a first set of spatial operations, wherein the subset of the plurality of geo-enriched data is a first subset of the plurality of geo-enriched data, wherein the program further comprises sets of instructions for:
- receiving a third request to focus on a descendant geographical element of the geographical element in the hierarchy of geographical elements, the third request comprising a selection of the descendant geographical element;
- performing a second set of spatial operations based on the plurality of geo-enriched data and the descendant geographical element to identify a second subset of the plurality of geo-enriched data associated with the descendant geographical element; and
- generating the map visualization to include the second subset of geo-enriched data and the descendant geographical element.

7. The non-transitory machine-readable medium of claim 1, wherein the geometries defined by each geographical element in the set of geographical elements associated with the level in the hierarchy of geographical elements is included in a geometry defined by a geographical element associated with an ancestor level of the level in the hierarchy of geographical elements.

8. A method comprising:
- receiving a request for a map visualization comprising a plurality of geo-enriched data and a set of geographical elements associated with a level of a plurality of levels in a hierarchy of geographical elements, wherein the plurality of geo-enriched data comprises a first plurality of spatial data to which a plurality of location data is converted, wherein each location data in the plurality of location data describes a location, area, or region, wherein each spatial data in the first plurality of spatial data defines a geometry of the location, area, or region described by a corresponding location data in the plurality of location data, wherein the set of geographical elements associated with the level of the plurality of levels in the hierarchy of geographical elements comprises a second plurality of spatial data, wherein each spatial data in the second plurality of spatial data defines a geometry that represents a corresponding geographical element in the set of geographical elements associated with the level of the plurality of levels in the hierarchy of geographical elements;
- accessing a first table to identify a row in the first table that corresponds to the level in the hierarchy of geographical elements;
- accessing a second table referred to by a reference to the second table stored in a field of the identified row in the first table to identify the set of geographical elements associated with the level, wherein the second table comprises the set of geographical elements associated with the level and the second plurality of spatial data; and
- generating the map visualization to include the plurality of geo-enriched data and the set of geographical elements, wherein the geometry of each geo-enriched data in the plurality of geo-enriched data is included within the geometry defined by spatial data in the second plurality of spatial data that represents a corresponding geographical element in the set of geographical elements.

9. The method of claim 8 further comprising providing the map visualizations to a client device for the client device to display on a display of the client device.

10. The method of claim 8, wherein the request is a first request, wherein the method further comprises:
- receiving a second request to focus on a geographical element in the set of geographical elements, the second request comprising a selection of the geographical element;
- performing a set of spatial operations based on the plurality of geo-enriched data and the geographical element to identify a subset of the plurality of geo-enriched data associated with the geographical element; and
- generating the map visualization to include the subset of geo-enriched data and the geographical element and not include geo-enriched data having geometries that are included in the geometries defined by geographical elements in the set of geographical elements other than the geographical element.

11. The method of claim 10 further comprising determining a set of ancestor geographical elements of the geographical element based on the hierarchy of geographical elements.

12. The method of claim 11, wherein the set of spatial operations is a first set of spatial operations, wherein the subset of the plurality of geo-enriched data is a first subset of the plurality of geo-enriched data, wherein the method further comprises:

receiving a third request to focus on an ancestor geographical element in the set of ancestor geographical elements, the third request comprising a selection of the ancestor geographical element;

performing a second set of spatial operations based on the plurality of geo-enriched data and the ancestor geographical element to identify a second subset of the plurality of geo-enriched data associated with the ancestor geographical element; and generating the map visualization to include the second subset of geo-enriched data and the ancestor geographical element.

13. The method of claim 10, wherein the set of spatial operations is a first set of spatial operations, wherein the subset of the plurality of geo-enriched data is a first subset of the plurality of geo-enriched data, wherein the method further comprises:

receiving a third request to focus on a descendant geographical element of the geographical element in the hierarchy of geographical elements, the third request comprising a selection of the descendant geographical element;

performing a second set of spatial operations based on the plurality of geo-enriched data and the descendant geographical element to identify a second subset of the plurality of geo-enriched data associated with the descendant geographical element; and generating the map visualization to include the second subset of geo-enriched data and the descendant geographical element.

14. The method of claim 8, wherein generating the map visualization to include the plurality of geo-enriched data and the set of geographical elements comprises generating the map visualization to include the geometries defined by the plurality of geo-enriched data and the geometries defined by the set of geographical elements.

15. A system comprising:
a set of processors; and
a non-transitory computer-readable medium storing instructions that when executed by at least one processor in the set of processors cause the at least one processor to:

receive a request for a map visualization comprising a plurality of geo-enriched data and a set of geographical elements associated with a level of a plurality of levels in a hierarchy of geographical elements, wherein the plurality of geo-enriched data comprises a first plurality of spatial data to which a plurality of location data is converted, wherein each location data in the plurality of location data describes a location, area, or region, wherein each spatial data in the first plurality of spatial data defines a geometry of the location, area, or region described by a corresponding location data in the plurality of location data, wherein the set of geographical elements associated with the level of the plurality of levels in the hierarchy of geographical elements comprises a second plurality of spatial data, wherein each spatial data in the second plurality of spatial data defines a geometry that represents a corresponding geographical element in the set of geographical elements associated with the level of the plurality of levels in the hierarchy of geographical elements;

access a first table to identify a row in the first table that corresponds to the level in the hierarchy of geographical elements;

access a second table referred to by a reference to the second table stored in a field of the identified row in the first table to identify the set of geographical elements associated with the level wherein the second table comprises the set of geographical elements associated with the level and the second plurality of spatial data; and generate the map visualization to include the plurality of geo-enriched data and the set of geographical elements, wherein the geometry of each geo-enriched data in the plurality of geo-enriched data is included within the geometry defined by spatial data in the second plurality of spatial data that represents a corresponding geographical element in the set of geographical elements.

16. The system of claim 15, wherein the instructions further cause the at least one processor to provide the map visualizations to a client device for the client device to display on a display of the client device.

17. The system of claim 15, wherein the request is a first request, wherein the instructions further cause the at least one processor to:

receive a second request to focus on a geographical element in the set of geographical elements, the second request comprising a selection of the geographical element;

perform a set of spatial operations based on the plurality of geo-enriched data and the geographical element to identify a subset of the plurality of geo-enriched data associated with the geographical element; and generate the map visualization to include the subset of geo-enriched data and the geographical element and not include geo-enriched data having geometries that are included in the geometries defined by geographical elements in the set of geographical elements other than the geographical element.

18. The system of claim 17, wherein the set of spatial operations is a first set of spatial operations, wherein the subset of the plurality of geo-enriched data is a first subset of the plurality of geo-enriched data, wherein the instructions further cause the at least one processor to:

determine a set of ancestor geographical elements of the geographical element based on the hierarchy of geographical elements;

receive a third request to focus on an ancestor geographical element in the set of ancestor geographical elements, the third request comprising a selection of the ancestor geographical element;

perform a second set of spatial operations based on the plurality of geo-enriched data and the ancestor geographical element to identify a second subset of the plurality of geo-enriched data associated with the ancestor geographical element; and generate the map visualization to include the second subset of geo-enriched data and the ancestor geographical element.

19. The system of claim 17, wherein the set of spatial operations is a first set of spatial operations, wherein the subset of the plurality of geo-enriched data is a first subset of the plurality of geo-enriched data, wherein the instructions further cause the at least one processor to:

receive a third request to focus on a descendant geographical element of the geographical element in the hierarchy of geographical elements, the third request comprising a selection of the descendant geographical element;

perform a second set of spatial operations based on the plurality of geo-enriched data and the descendant geographical element to identify a second subset of the plurality of geo-enriched data associated with the descendant geographical element; and generate the map visualization to include the second subset of geo-enriched data and the descendant geographical element.

20. The system of claim 15, wherein request is a first request, wherein the level of the plurality of levels is a first level, wherein the set of geographical elements is a first set of geographical elements, wherein the instructions further cause the at least one processor to:

receive a second request for the map visualization comprising the plurality of geo-enriched data and geographical elements associated with a second level of the plurality of levels in the hierarchy of geographical elements;

identify a set of geographical elements associated with the second level based on the hierarchy of geographical elements; and generate the map visualization to include the plurality of geo-enriched data and the set of geographical elements.

* * * * *